United States Patent
George et al.

(10) Patent No.: US 10,105,608 B1
(45) Date of Patent: Oct. 23, 2018

(54) APPLYING PARTICIPANT METRICS IN GAME ENVIRONMENTS

(71) Applicant: Amazon Technologies, Inc., Seattle, WA (US)

(72) Inventors: Michael Martin George, Mercer Island, WA (US); Michael Anthony Frazzini, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 14/975,378

(22) Filed: Dec. 18, 2015

(51) Int. Cl.
*A63F 13/86* (2014.01)

(52) U.S. Cl.
CPC ................... *A63F 13/86* (2014.09)

(58) Field of Classification Search
CPC ...... A63F 13/12; A63F 13/86; A63F 2300/10; A63F 2300/69; A63F 2300/305; A63F 2300/535; A63F 2300/572; A63F 2300/577; A63F 2300/634; A63F 2300/1012; A63F 2300/1087
See application file for complete search history.

(56) References Cited

U.S. PATENT DOCUMENTS

| 6,190,314 | B1 | 2/2001 | Ark et al. |
| 8,519,835 | B2 | 8/2013 | Dunko |
| 8,628,424 | B1* | 1/2014 | Kern ................. A63F 13/86 463/31 |
| 8,814,754 | B2 | 8/2014 | Weast et al. |
| 9,019,174 | B2 | 4/2015 | Jerauld |
| 9,031,293 | B2 | 5/2015 | Kalinli-Akbacak |
| 2003/0044021 | A1* | 3/2003 | Wilkinson ........... A61B 5/0002 381/56 |
| 2003/0220143 | A1* | 11/2003 | Shteyn .................... A63F 13/12 463/42 |
| 2007/0117635 | A1* | 5/2007 | Spanton .................. A63F 13/12 463/43 |

(Continued)

OTHER PUBLICATIONS

Heo, Hwan, et al. "A realistic game system using multi-modal user interfaces." Consumer Electronics, IEEE Transactions on 56.3 (Aug. 2010): pp. 1364-1372.

(Continued)

*Primary Examiner* — Jason Yen
(74) *Attorney, Agent, or Firm* — Robert C. Kowert; Meyertons, Hood, Kivlin, Kowert & Goetzel, P.C.

(57) ABSTRACT

A system that collects, analyzes, and applies physical metrics from participants in game environments. Participants (players and/or spectators) in a game may wear or hold devices that collect physical data from the participants via sensors, generate metrics data from the sensor data, and provide the metrics data to a participant metrics module. The module may receive the metrics data from the devices, analyze the metrics data to generate game inputs based on the participants' physical metrics, and provide the game inputs to the game system to affect game play. The module may also receive alerts or other information from the game system or from players, determine feedback for participants according to the received information, and signal the devices to provide feedback or alerts to the participants in the game. The devices may include indicators that are activated by the signals to provide visual, audio, and/or haptic indications to respective participants.

26 Claims, 12 Drawing Sheets

(56) References Cited

U.S. PATENT DOCUMENTS

| | | | |
|---|---|---|---|
| 2008/0079752 A1* | 4/2008 | Gates | G06F 3/011 |
| | | | 345/633 |
| 2011/0244954 A1* | 10/2011 | Goldman | A63F 13/53 |
| | | | 463/30 |
| 2011/0300847 A1 | 12/2011 | Quy | |
| 2013/0179911 A1* | 7/2013 | Dang | H04N 21/42201 |
| | | | 725/12 |
| 2013/0225261 A1 | 8/2013 | Cruz-Hernandez | |
| 2014/0085101 A1 | 3/2014 | Rahman et al. | |
| 2014/0089399 A1 | 3/2014 | Chun et al. | |
| 2014/0228664 A1 | 8/2014 | Alcazar | |
| 2014/0245784 A1 | 9/2014 | Proud et al. | |
| 2014/0247151 A1 | 9/2014 | Proud et al. | |
| 2014/0249853 A1 | 9/2014 | Proud et al. | |
| 2015/0230756 A1 | 8/2015 | Luna et al. | |
| 2015/0268721 A1 | 9/2015 | Joo | |
| 2015/0341903 A1 | 11/2015 | Jeong et al. | |
| 2016/0042648 A1 | 2/2016 | Kothuri | |
| 2017/0072324 A1* | 3/2017 | Navok | A63F 13/86 |

OTHER PUBLICATIONS

Peter, Christian, Eric Ebert, and Helmut Beikirch. "A wearable multi-sensor system for mobile acquisition of emotion-related physiological data." Affective Computing and Intelligent Interaction. Springer-Verlag Berlin Heidelberg, 2005. pp. 691-698.

Rani, Pramila, Nilanjan Sarkar, and Changchun Liu. "Maintaining optimal challenge in computer games through real-time physiological feedback." Proceedings of the 11th international conference on human computer interaction. vol. 58. 2005, pp. 1-7.

U.S. Appl. No. 14/732,580, filed Jun. 5, 2015, Ethan Zane Evans, et al.

U.S. Appl. No. 14/732,582, filed Jun. 5, 2015, Ethan Zane Evans, et al.

* cited by examiner

APPLYING PARTICIPANT METRICS IN GAME ENVIRONMENTS

BACKGROUND

Computer-based games have evolved from single-player game programs installed and executed on personal computers or other consumer devices to include technologies that allow multiplayer gaming in which two or more players may simultaneously participate in a game session. For example, game consoles may host console-based games that allow one, two, or more players to simultaneously participate in a game session via controllers connected to the console. As another example, network-based games, which may be referred to as online games, may allow one, two, or more players, in some cases even thousands of players, to simultaneously participate in a game from consumer devices coupled to a network. Evolution of the Internet, Web-based computing, and mobile computing, including the increasingly widespread availability of broadband connections, support for high-resolution video, and the availability and capabilities of consumer computing devices including but not limited to mobile computing devices such as pad/tablet devices and smartphones, has led to continuing evolution and growth of online gaming. Online games may include everything from relatively simple, two-dimensional (2D) casual games to more complex 2D or three-dimensional (3D) action, sports, or strategy games that may involve one or more players in a game session, to multiplayer online battle arena (MOBA) games, to world-building multiplayer games, to complex 3D massively multiplayer online games (MMOGs) such as massively multiplayer online role-playing games (MMORPGs) that may support hundreds or thousands of active players in a persistent online "world".

The continued evolution and growth of online gaming has in turn led to the rise in popularity of video game spectating, or virtual spectating. In virtual spectating, one or more spectators may watch the game play of one or more other players participating in an online game without themselves participating as players in the game play. At least some online games may provide a "spectator" or "observer" mode that allows spectators to watch game play without directly participating in the game. For example, in a multiplayer online game, spectators may watch one or more players or teams of players involved in a battle or otherwise participating in game play. In addition, broadband Internet, high-resolution video, and video streaming technologies have led to the development of live broadcasting technologies that may be leveraged to provide virtual spectating for online games. For example, a game spectating system may allow players to broadcast live or recorded streams of their game play to tens, hundreds, or thousands of spectators, while allowing the spectators to select the live or recorded broadcasts of particular players for viewing.

Figure 1:
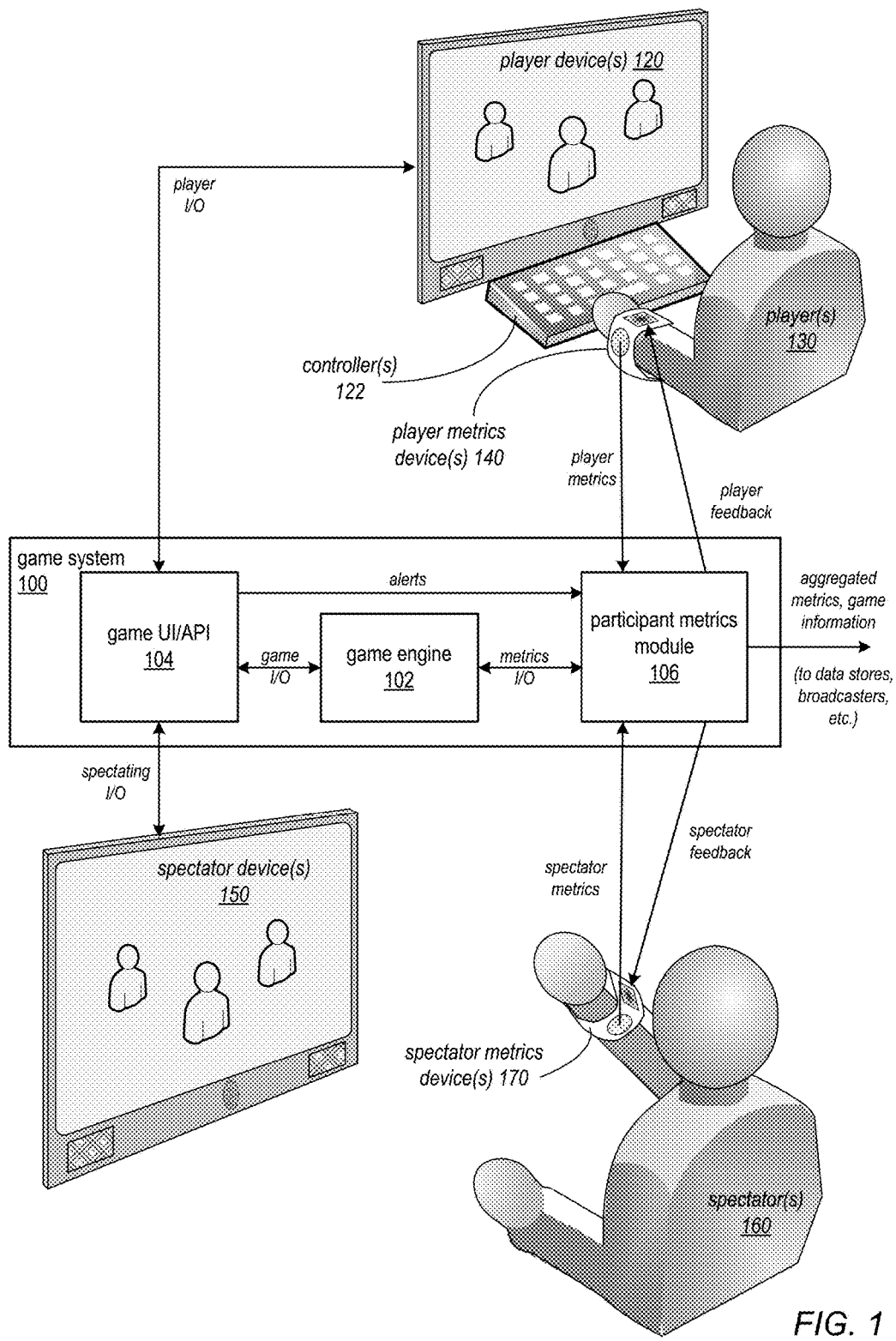
FIG. 1 illustrates a game environment in which metrics are collected from participants via metrics devices to affect a game, and in which feedback is provided to the participants from the game through the metrics devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for collecting, analyzing, and applying participant metrics in game environments are described. The game environments may include, but are not limited to, console games, online games, and game spectating systems. The participants may include game players and game spectators. Embodiments of participant metrics collection, analysis, and application methods and systems are described that may be used in game environments to collect, analyze, and apply participant metrics collected from participants (e.g., players and/or spectators) and apply the analysis information to affect game play and/or game spectating in various ways. Embodiments of a participant metrics module or service are described that may, for example, be used with game systems in game environments to process and apply participant metrics collected from players and/or spectators of the games to affect game play, in-game characters, teams, or objects, game environmental factors or conditions, the game spectating environment, and/or the game participants. Embodiments may also generate game-related information from participant metrics collected from players and/or spectators of the games, and may store the game-related information and/or provide the game-related information to one or more entities including but not limited to game broadcasters and game developers.

Devices, referred to herein as metrics devices or participant metrics devices, are described that may, for example, be worn or held by the participants, during game play when the participants are playing or spectating a game, when the participants are not actively participating in game play or game spectating, or by spectators when viewing recordings of previously played games (e.g., video on demand). Participant metrics (also referred to herein simply as "metrics") may be collected from the participant metrics devices, for example by a participant metrics module as described herein. The participant metrics may include any data or information about respective participants and/or their current environment that can be captured by or obtained from participant metrics devices. For example, the participant metrics devices may include one or more sensors or other components that measure or otherwise obtain one or more participant metrics including but not limited to physical metrics or biometrics, of the participants during game play or when the participants are not actively participating in game play. The metrics that are obtained by the participant metrics devices may include one or more of pulse, heart rate, breath rate, temperature, electrodermal activity, motion, position, or in general any physical or biological metric that can be measured by sensors of a device worn or held by a human. The metrics that are obtained by the participant metrics devices may also include or be used to determine other data or information including but not limited to the physical location of the participants, affinity or association of the participants with particular teams, players or games (e.g., an indication of a particular player or team that a spectator is a fan of), and so on. The metrics may, for example, indicate participants' (spectators and/or players) reactions to game play. As another example, the metrics may indicate or be used to determine whether the participants associated with the participant metrics devices are currently participating as spectators or players in a game session. The metrics collected from spectators and/or players in a game environment by the participant metrics devices may be collected, aggregated, and analyzed by a component of the game environment referred to herein as a participant metrics module. For example, the collected metrics for an individual participant or collection of participants may be analyzed to generate game inputs based on analysis of the participants' reactions to game play. The game inputs may be provided by the participant metrics module to a game system or game engine that executes the game in the game environment as controlled by the game players via respective devices that support game play. The game system may apply the game inputs generated from the participant metrics to affect the game environment, game play, and/or game players in various ways. As another example, the metrics for individual participants or collection of participants may be stored, for example in a participant metrics database, as participant metrics data, and the participant metrics data may be provided to or accessed by one or more entities such as game developers for meta-analysis of games, game play, game spectating, and game environments. As another example, the metrics for individual participants or collections of participants may be analyzed to generate game-related information that may be provided to game systems, game broadcasters, or other entities in real-time or near-real-time, for example to broadcasters in game tournament environments.

In some embodiments, the participant metrics devices may also include one or more indicators (e.g., display screens, lights, speakers, active surface materials, motion or thermal devices, etc.) that may, for example be used to signal participants (spectators and/or players), for example during game play, for example to provide feedback or alerts to the spectators and/or players. The feedback to the participants may include, but is not limited to, visual, audio, and/or haptic signals. Visual signals may, for example, include one or more of lights, surface color changes, and on-screen displays. Audio signals may, for example, include one or more of beeps, rings, tones, music, and voice. Haptic signals may, for example, include one or more of pressure, vibration, and thermal signals, or in general any signal that can be sensed through contact with or proximity to the skin or by the sense of touch.

In some embodiments, the participant metrics devices may also include one or more control modules or components that collect sensor data from the sensor(s) and communicate metrics data to the participant metrics module, for example via wired and/or wireless network connections and network protocols. The control modules may also receive feedback signals from the participant metrics module or from other sources, for example via wired and/or wireless network connections and network protocols, and provide the signals to one or more indicators of the participant metrics devices.

In some embodiments, participant metrics devices may include network-connectable wearable devices or items of clothing including but not limited to wristbands, bracelets, watches, shirts, jackets, rings, helmets, goggles, glasses, and hats or caps. In some embodiments, participant metrics devices may instead or also include network-connectable handheld devices, including but not limited to game controllers that implement at least part of the participant metrics device sensing and/or signaling functionality as described herein. In some embodiments, participant metrics device sensing and/or signaling functionality may be integrated with or included in other devices such as smartphones, keyboards, cursor control devices, and remote controls, and thus these devices may be used as or with participant metrics devices in game environments as described herein. Non-limiting examples of participant metrics devices are described in reference to FIGS. 7A through 7D.

In some embodiments, participant metrics devices may be associated or affiliated with particular games, teams, or players. For example, fans of team A may obtain participant metrics devices that are associated with team A, and fans of team B may obtain participant metrics devices that are associated with team B. As another example, fans of a particular player may obtain and wear participant metrics devices associated with that particular player. As another example, participant metrics devices may be associated with particular games or game titles. In some embodiments, one or more mechanisms may be provided that may be used by a participant to change the player, team, or game that their participant metrics device is associated with. In some embodiments, the player, team, or game that a participant metrics device is associated with may be automatically changed in response to a respective participant's actions, for example in response to a spectator announcing that he or she is switching player or team affiliations in a chat window of a game system or spectating system interface. The metrics collected from the participant metrics devices may thus indicate the affiliations of particular participants with, or the support of particular participants for, particular teams, players, or games. In some embodiments, meta-information such as the number of participants that have purchased or are wearing participant metrics devices associated with a team or player may be used to affect teams, players, and/or the game environment. For example, powers, strength, health, or other attributes of a character associated with a player may be affected based on the number of spectators that have purchased or are wearing participant metrics devices associated with that player.

While participant metrics devices are generally described herein as including wearable or handheld devices, in some embodiments participant metrics devices may include other types of network-connected devices that are not necessarily worn or held by the participants, but that may capture and provide (via wired or wireless network connections) participant metrics in the participants' environment. For example, in some embodiments, a room or facility (e.g., a participant's living room or house) may include sensors or other devices (e.g., motion detection sensors, infrared sensors, cameras, microphones, etc.) from which participant metrics data may be obtained via wired or wireless Internet connections. As another example, a participant's keyboard may be configured as a participant metrics device that captures typing metrics such as typing speed, key depression force or pressure, time between keystrokes, and so on; the typing metrics may be collected and analyzed to determine baseline typing signatures for participants and information about particular participants or groups of participants based on their typing signatures. As another example, a punching bag or other device or object in a participant's environment may include sensors that capture and provide, via a wired or wireless network connection, metrics input based on the participant's interactions with the device, for example how often and how hard a participant strikes an object such as a punching bag.

In some embodiments, participant metrics for multiple players (e.g., players in groups or teams) may be collected from player metrics devices and analyzed by the participant metrics module to determine, for example, the current states (e.g., emotions, moods, excitement level, stress level, anger, sadness, happiness, frustration, fear, shock, surprise, amusement, motion, position, affiliations with particular players or teams, whether currently participating or not participating in a game, etc.) of the players/groups, and game play may be affected based on the analysis. In some embodiments, participant metrics for multiple spectators may be collected from spectator metrics devices and analyzed to determine, for example, the states (e.g., emotions, moods, excitement level, stress level, anger, sadness, happiness, frustration, fear, shock, surprise, amusement, motion, position, affiliations, whether currently participating or not participating in a game, etc.) of the spectators or crowd, and game play or game players or teams may be affected based on the analysis. In some embodiments, player and/or spectator metrics may be collected and analyzed to determine events or states within a game or within one or more broadcast channels in a game spectating system, and the analysis results may be used to affect the game and/or game spectating environment, for example by indicating or highlighting broadcasts, games, or events of interest within broadcasts or games to the spectators via the spectator metrics devices.

Figure 2:
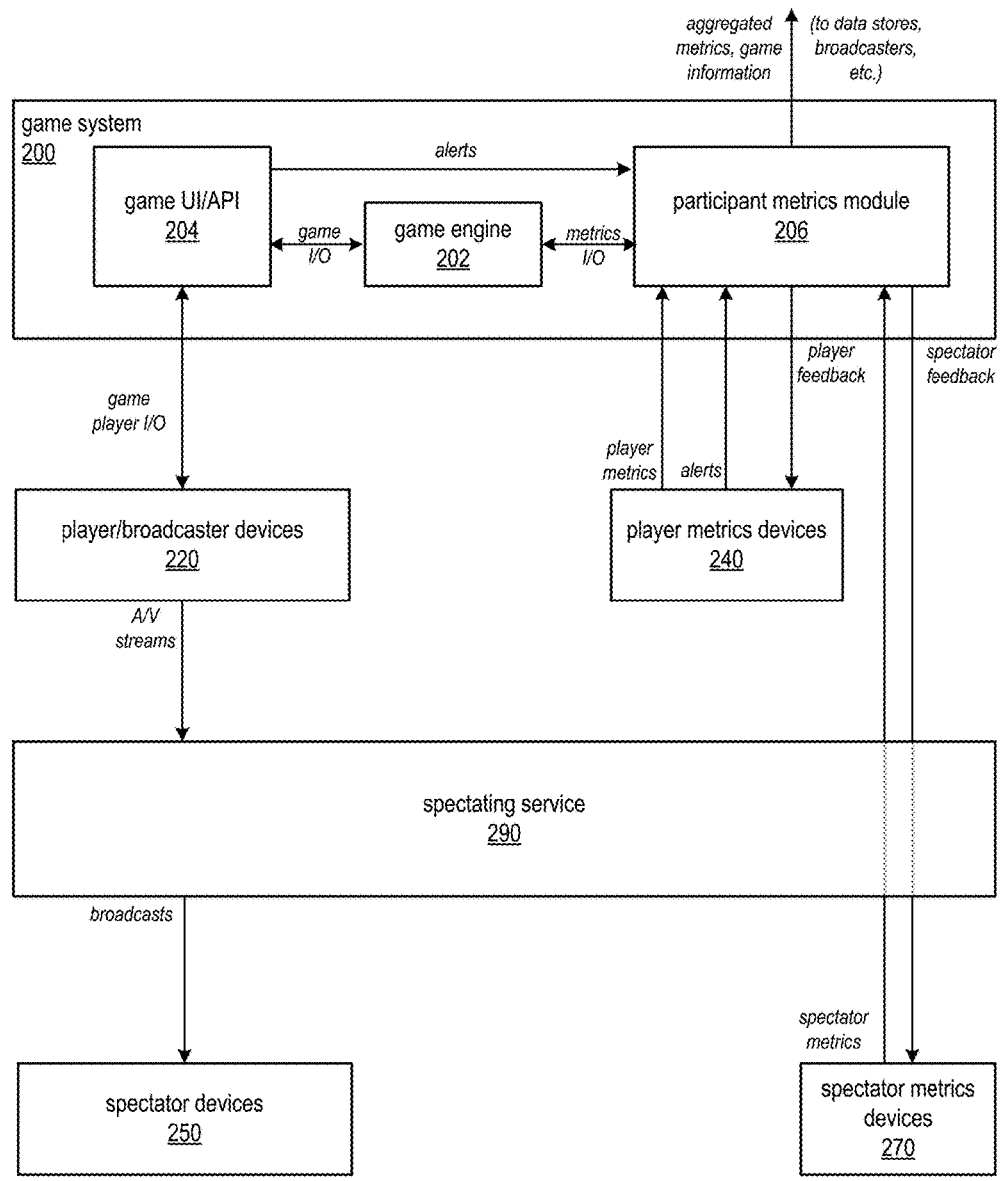
FIG. 2 is a block diagram that illustrates a game system collecting metrics from participant metrics devices and providing feedback to participant metrics devices in a spectating environment, according to some embodiments.
Figure 3:
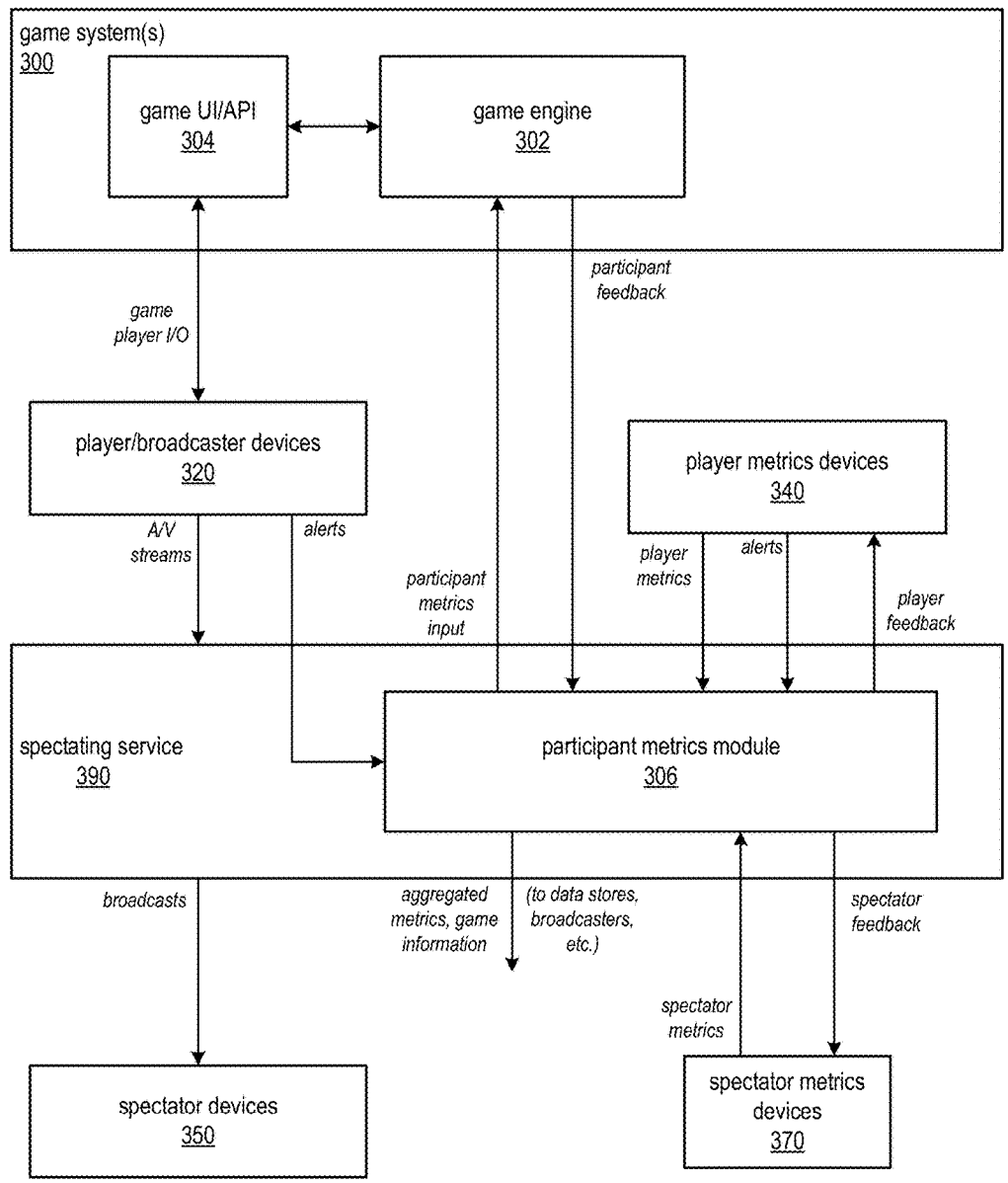
FIG. 3 is a block diagram that illustrates a spectating service collecting metrics for games from participant metrics devices and providing feedback from the games to participant metrics devices in a spectating environment, according to some embodiments.
Figure 10:
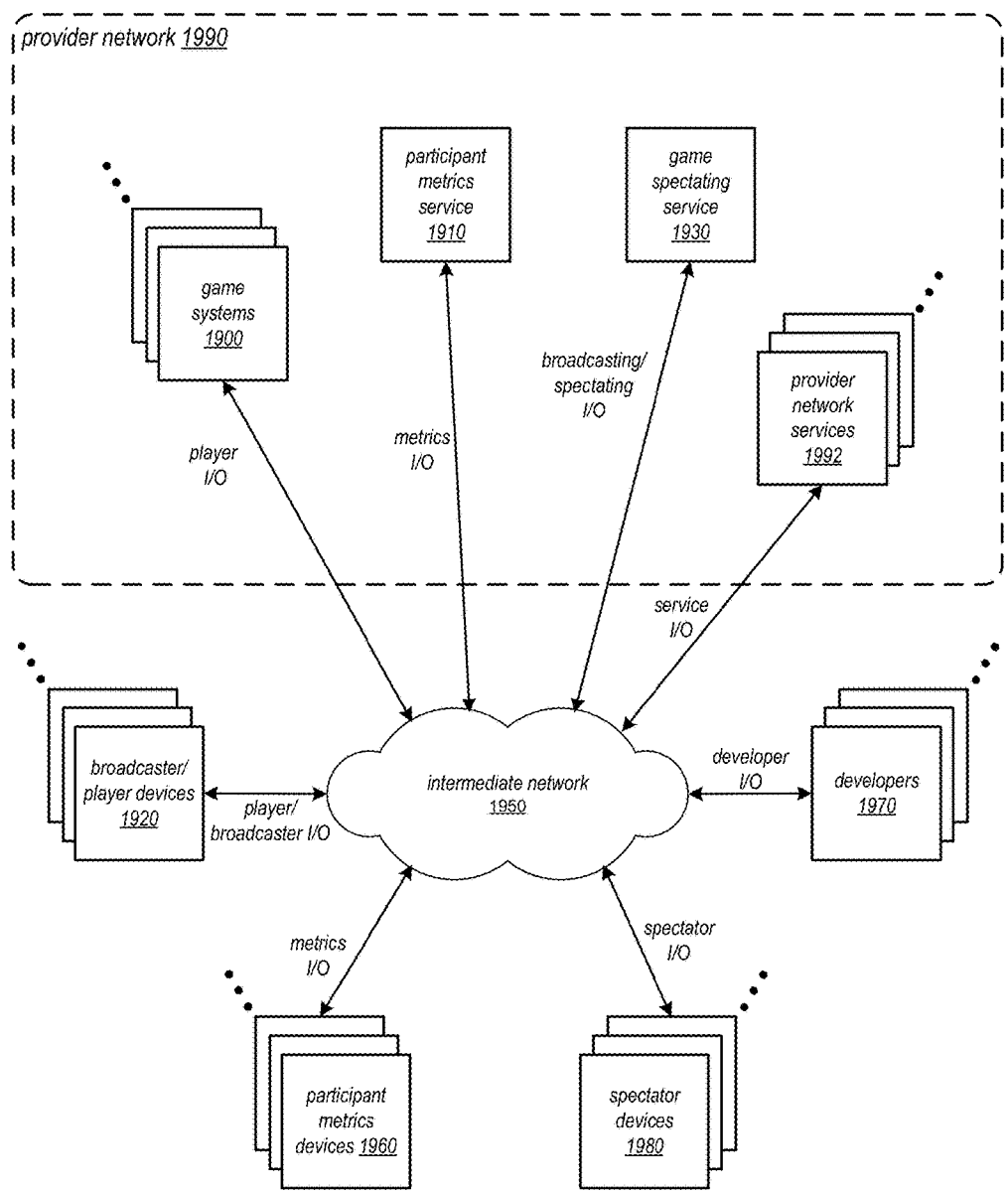
FIG. 10 illustrates an example network-based game and game spectating environment, according to some embodiments.

Game environments may include, but are not limited to, console games, online games, and game spectating systems. For simplicity, game implementations in general may be referred to as game systems. In a game system, players actively participate in game play as executed by a game engine, while spectators watch the game play of the players, possibly but not necessarily from remote locations. A game spectating system includes one or more game systems and a spectating service that broadcasts game play to spectators, with at least some players in the games executed by the game systems also acting as broadcasters. In some embodiments, a participant metrics module may be implemented as a component of a game system in a game environment, for example as illustrated in FIG. 1, or of game system(s) in a game spectating environment, for example as illustrated in FIG. 2. In some embodiments, a participant metrics module may be implemented by a spectating service in a game spectating environment, for example as illustrated in FIG. 3. In some embodiments, a participant metrics module may be implemented as or by an application or service external to the game system(s) and spectating service, for example as illustrated in FIG. 10.

Online games are network-based games that may allow one, two, or more players, in some cases even thousands of players, to simultaneously participate in a game from consumer devices coupled to a network. At least some online games may provide a "spectator" or "observer" mode that allows spectators to watch game play from consumer devices coupled to the network without directly participating in the game. At least some online games may also allow game sessions to be recorded and played back for viewing by the players and/or spectators.

Games that may be implemented in gaming environments as described herein may vary from tightly scripted games to games that introduce varying amounts of randomness to the game play. A game may, for example, be a game in which the players attempt to achieve some goal or overcome some obstacle, and may include multiple levels that the players have to overcome. A game may, for example, be a game in which the players cooperate to achieve goals or overcome obstacles, or a game in which one or more of the players compete against one or more other players, either as teams or as individuals. Alternatively, a game may be a game in which the players may more passively explore and make discoveries within a complex game universe without any particular goals in mind, or a "world-building" game in which the players may actively modify their environments within the game universe. Games may include everything from relatively simple, two-dimensional (2D) casual games to more complex 2D or three-dimensional (3D) action, sports, or strategy games, to multiplayer online battle arena (MOBA) games, to complex 3D massively multiplayer online games (MMOGs) such as massively multiplayer online role-playing games (MMORPGs) that may simultaneously support hundreds or thousands of players in a persistent online "world".

Game spectating systems may include network-based video streaming systems or services that may allow players to broadcast live streams of their online game play to tens, hundreds, thousands or more spectators, while allowing the spectators to select the broadcasts of particular players (also referred to as channels) for viewing. A game spectating system may support live streaming of broadcasts from tens, hundreds, or thousands of players simultaneously. A game spectating system may record at least some live broadcasts and allow the recorded broadcasts to be played back for viewing by spectators. A game spectating system may support live and recorded broadcasts for one, two, or more different online games.

In this document, the term "player" is generally used to refer to an actual human that actively participates in a game, the term "spectator" is generally used to refer to an actual human that watches live or recorded game play without directly participating in the game as a player, the term "participant" is generally used to collectively refer to players (active participants) and spectators (passive participants), the term "client" (as in "client device", "game client", "broadcasting client", and "spectating client") is generally used to refer to a hardware and/or software interface to a game system or streaming system via which a participant interacts with the game system and/or spectating system, and the term "character" or "game character" is generally used to refer to a player's in-game presence or "avatar" that the player may control via a game client on a client device to interact with other game characters, other game entities, and other objects within the game environment during a game session. Note, however, that the term "participants" as used herein may also encompass persons, referred to as "supporters," that are not currently playing, spectating, or otherwise involved in live or recorded game play but that may be wearing or carrying participant metrics devices as described herein. In addition, the term "broadcaster" as used herein is generally used to refer to an actual human that watches live or recorded game play and that generates video, text, and/or audio commentary on and/or description of the game play; a broadcaster may be, but is not necessarily, a player. In addition, the term "spectator" as used herein may also encompass persons who are listening to audio of game play, broadcaster commentary or description, and so on. This information may be used, for example, by the participant metrics module and/or game systems to map the metrics input from the participant metrics devices to particular players, teams, or games affiliated with the devices.

While embodiments are primarily described herein in the context of collecting, analyzing, and applying participant metrics in multiplayer online gaming environments in which two or more players participate in online game sessions, it is to be noted that embodiments may also be applied in single-player online games, as well as in single-player and multiplayer games that are not necessarily online, such as single-player and multiplayer console games that may be played locally/offline. In addition, in some embodiments, a spectating system may support broadcasts of live and/or recorded digital media content from sources other than game systems, for example from sports games, competitions, concerts, and other events including but not limited to live streams from electronic spectator sports (eSports) competitions, and embodiments may also be applied to collect, analyze, and apply participant metrics for these broadcasts.

While embodiments are primarily described herein in the context of collecting, analyzing, and applying participant metrics such as pulse, heart rate, breath, temperature, electrodermal activity, motion, and position in game environments, it is to be noted that embodiments may also analyze content of other participant inputs to the game environment, for example audio input and text input to an online chat user interface element of an online game or spectating system broadcast, and may use that analysis alone or in combination with the analysis of the metrics collected by the participant metrics devices to, for example, detect states of participants and affect the game accordingly. As another example, some embodiments may obtain images of participants' faces (broadcasters, players, commentators and/or spectators) captured during game play or broadcast, for example images captured by cameras attached to or integrated with the participants' respective devices. The images may be analyzed, for example using facial recognition techniques and techniques that detect emotions via analysis of facial expressions, and that analysis may be used alone or in combination with analysis of the metrics collected by the participant metrics devices to determine states of participants and affect a game accordingly. As another example, some embodiments may obtain images of participants' eyes (broadcasters, players, commentators and/or spectators) captured during game play or broadcast, for example images captured by cameras attached to or integrated with wearable computing devices such as smart glasses, goggles, optical head-mounted displays, virtual reality (VR) headsets, and the like. The images may be analyzed, for example using techniques that detect emotions or other states via tracking and analysis of eye movements, blinking, dilation, and so on, and that analysis may be used alone or in combination with analysis of the metrics collected by the participant metrics devices to determine states of participants and affect a game accordingly.

While embodiments are primarily described herein in the context of collecting, analyzing, and applying metrics collected from spectators viewing live games or live or prerecorded video or broadcasts of games, in some embodiments participant metrics may be collected from spectators (or listeners) of audio-only broadcasts or playbacks of games or game broadcasts to generate game information according to the spectators' metrics as collected while the spectators are listening to the game play, game commentary, and/or game play-by-play description.

FIG. 1 illustrates a game environment in which metrics are collected from participants via metrics devices to affect a game, and in which feedback is provided to the participants from the game through the metrics devices, according to some embodiments. In some embodiments, a game environment may include a game system 100 and multiple client devices; the client devices may include player device(s) 120 and spectator device(s) 150. The game system 100 stores game data and information, implements game logic, and serves as an execution environment for the game. Each player device 120 may include, but is not limited to, input and output components and client software for the game via which respective players 130 can participate in a game being executed by the game system 100. Each spectator device 150 may include, but is not limited to, input and output components and client software via which one or more spectators 160 may watch current games or recorded game sessions.

Figure 11:
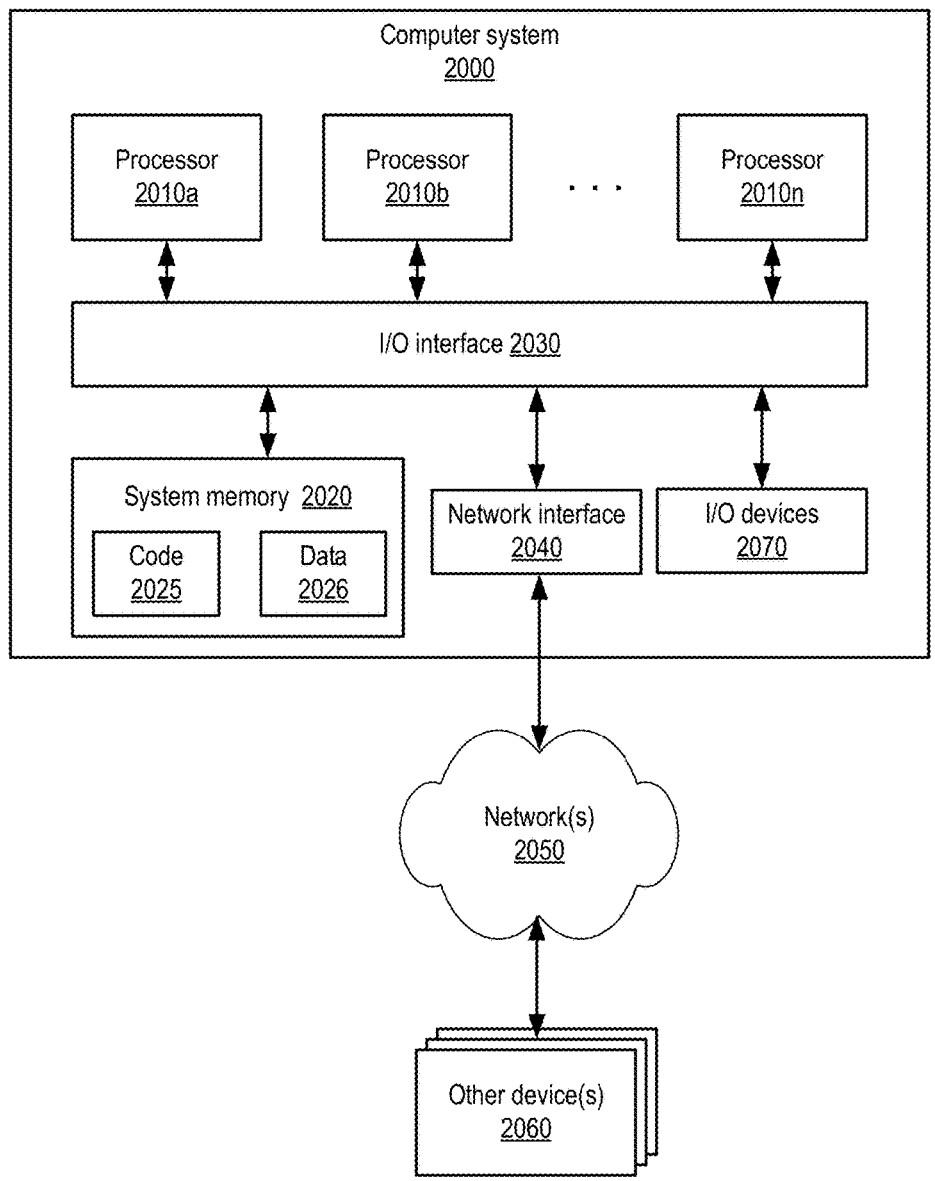
FIG. 11 is a block diagram illustrating an example computer system that may be used in embodiments.

In some embodiments, a game system 100 stores game data and information in a data store, implements game logic (game engine 102), and serves as an execution environment for the game. The game system 100 may also implement one or more user interfaces (UIs) and one or more application programming interfaces (APIs) (shown as UI/API 104) to the game system functionality. In some embodiments, a game system 100 may include one or more computing devices, for example one or more server devices, that implement the game logic, and may also include other devices including but not limited to storage devices that store game data including but not limited to recordings of game sessions and participant information. However, in some embodiments, functionality and components of a game system 100 may be implemented at least in part on one or more of the client devices. An example computing device that may be used in a game system 100 is illustrated in FIG. 11.

A client device 120 or 150 may be any of a variety of consumer devices including but not limited to desktop computer systems, laptop/notebook computer systems, pad/tablet devices, smartphone devices, game consoles, handheld gaming devices, and wearable devices. Wearable devices may include, but are not limited to, gaming glasses or goggles and gaming "watches" or the like that are wearable on the wrist, arm, or elsewhere. Thus, client devices may range from powerful desktop computers configured as gaming systems down to "thin" mobile devices such as smartphones, pad/tablet devices, and wearable devices. Each client device may implement an operating system (OS) platform that is compatible with the device. A client device may include, but is not limited to, input and output components and client software for the game via which respective players can participate in a game session currently being executed by the game system 100, and via which one or more spectators may watch current game sessions or recorded game sessions. The game client on a particular client device may be tailored to support the configuration and capabilities of the particular device type and the OS platform of the device. An example computing device that may be used as a client device 120 or 150 is illustrated in FIG. 11.

In some embodiments, client devices 120 and/or 150 may include audiovisual (A/V) components such as video cameras and microphones that may receive audio (e.g., voice or speech) and video input from game players 130 and/or spectators 150 during game play and/or spectating. In some embodiments, the game system 100 may receive the A/V input via UI/API 104. Video input may be received in any of a variety of video formats. Audio input may, for example, be received by game system 100 as audio tracks in video input, as Voice over IP (VoIP), or according to other network formats or protocols that support digital audio transmission. In some embodiments, game system 100 may receive player audio and/or video input from player devices 120, and may also receive spectator audio and/or video input from spectator devices 150.

In some embodiments, the game system 100 may implement an online multiplayer game, and the game system 100 may be or may include one or more devices on a network of a game provider that implement the game engine 102 and UI/API 104 and that serve as or provide an execution environment for the online multiplayer game. In these online multiplayer game environments, client devices 120 and 150 are typically remotely located from the game system 100 and access the game system 100 via wired and/or wireless connections over an intermediate network or networks such as the Internet. Further, the client devices may typically have both input and output capabilities for playing and/or spectating the online multiplayer game.

In some embodiments, instead of a game system 100 implemented according to a client-server model or variation thereof in which one or more devices such as servers host most or all of the functionality of the online game, a game system 100 may at least in part be implemented as or on local devices that implement at least a portion of the game logic, for example gaming consoles that serve as local execution environments for console-based online multiplayer games installed on the console or executed from media inserted into the console. One or more client devices 120 and 150 may be local to the game system 100, and may access the game system 100 via local wired or wireless connections for game play or spectating.

In some embodiments, instead of a game system 100 implemented according to a client-server model or variation thereof in which one or more devices such as servers host most or all of the functionality of the game system 100, a game system 100 may be implemented according to a distributed or peer-to-peer architecture in which at least some of the game functionality and components of the game system 100 are distributed among one, two, or more client devices 120 and/or 150 that collectively participate in a peer-to-peer relationship to execute, play in, and/or spectate game sessions.

The following is a broad description of an example method for game execution in a game environment, and is not intended to be limiting. In some embodiments, for a particular game session, the game engine 102 of the game system 100 may generate a game universe that includes the game session's context, characters, and environment. The players 130 manipulate their characters within this universe via the player devices 120 and/or controllers 122. The game system 100 may generate and display a view of the game universe from the perspective of each player's character to the player 130 on the player's respective device 120, and may receive player input to and interactions with the game universe via the player's respective device 120 and/or controller 122. The game system 100 may also generate and display a view of the game universe from the current perspective or viewpoint of each spectator 170 on the spectator's respective device 150. Note that the spectators 170 typically do not have characters or avatars that appear within the game universe.

Typically, game logic/execution of the game system 100 is implemented in game engine 102 according to event-driven architecture in which a game event loop monitors for and reacts to players' inputs to and interactions with the game universe via their respective devices 120 and/or controllers 122. Based upon the players' inputs and interactions with the universe and on other game factors (e.g., scripted events and/or a randomness component) at iterations of the game event loop, the game session progresses along a game session timeline, with the game universe being modified and updated accordingly.

In some embodiments, concurrent with the game event loop execution, game system 100 renders a 2D or 3D representation of the game universe based on the current state of the universe, generates video and sound according to a video frame rate based upon the rendering, and sends or streams the video and sound output to the client devices 120 and/or 150 for display. In some embodiments, the video and sound may be generated for and sent or streamed to each client device 120 and/or 150 according to a corresponding participant's current perspective or view of the universe. The game clients on these client devices 120 and/or 150 may be referred to as "thin" game clients as the game clients may not implement a 2D or 3D rendering component. However, in some embodiments, at least a portion of the actual rendering may be performed by "thick" game clients on the client devices 120 and/or 150 that do implement a 2D or 3D rendering component. In these implementations, instead of the game system 100 performing the full rendering of the game universe into video and sound and sending the video and sound to "thin" game clients on client devices 120 and/or 150 for display, the game system 100 may instead send game universe data to the client devices 120 and/or 150 from which thick game clients can render and display video and sound.

In FIG. 1, a participant metrics module 106 is implemented as a component of the game system 100 in the game environment. The game system 100 also includes a game engine 102 that executes the game as controlled by one or more players 130 via player device(s) 120 and/or controllers 122, and game user interface/application programming interface (UI/API) 104 components that interface with player device(s) 120 and spectator device(s) 150 to provide input to and output from the game engine 102. While FIG. 1 shows participant metrics module 106 as separate from game engine 102, in some embodiments participant metrics module 106 may be a component of game engine 102.

Figure 6:
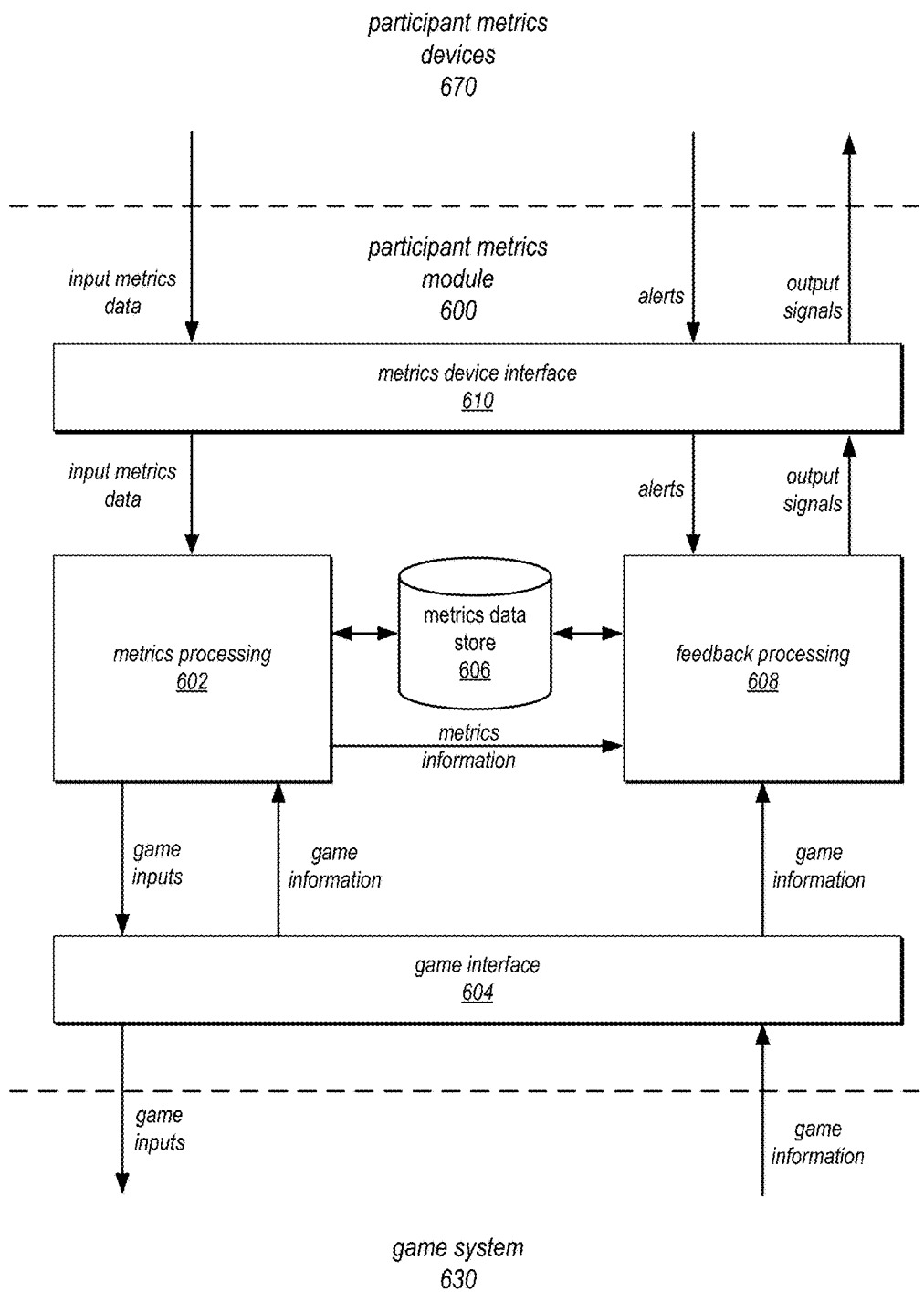
FIG. 6 illustrates an example participant metrics module, service, or system that collects, analyzes, and applies participant metrics in a game environment, according to some embodiments.

In some embodiments, participant metrics module 106 may include one or more computing devices, for example one or more server devices, that implement a metrics processing engine that provides metrics analysis functionality and one or more application programming interfaces (APIs) to the metrics analysis functionality. Participant metrics module 106 may also include or access other devices including but not limited to storage devices for storing metrics analysis information for individual participants (players and/or spectators), groups, crowds, and/or games including but not limited to participant metrics patterns that can be matched or mapped to individual participants' states, group or crowd states, particular game events, and so on. In some embodiments, participant metrics module 106 may be implemented as a separate system from game system 100, for example as a network-based service that is accessible by one or more entities including but not limited to game system 100. In some embodiments, as shown in FIG. 1, participant metrics module 106 may be implemented as a component, module, or subsystem of a game system 100. FIG. 6 illustrates components and operations of an example participant metrics module 106, according to some embodiments. An example computing device that may be used in a participant metrics module 106 is illustrated in FIG. 11.

Devices, referred to herein as participant metrics devices or simply metrics devices, may, for example, be worn or held by the participants during game play when the participants are playing or spectating a game, when the participants are not actively participating in game play or game spectating, or by spectators when viewing recordings of previously played games (e.g., video on demand). The participant metrics devices may include player metrics device(s) 140 and spectator metrics device(s) 170. Note that the metrics devices may all be the same type of device or may include different types of devices. Each participant metrics device may include one or more sensors or other components that measure or otherwise obtain one or more participant metrics, including but not limited to physical metrics or biometrics, of the participants during game play or when the participants are not actively participating in game play. The metrics that are obtained by the participant metrics devices may include pulse, heart rate, breath, temperature, electrodermal activity, motion, position, or in general any physical or biological metric that can be measured or otherwise obtained by sensors or other components of a device worn or held by a human. The metrics that are obtained by the participant metrics devices may also include or be used to determine other data or information including but not limited to the physical location of the participants, affinity or association of the participants with particular teams, players or games (e.g., an indication of a particular player or team that a spectator is a fan of), and so on. The metrics may, for example, indicate participants' (spectators 160 and/or players 130) reactions to game play. As another example, the metrics may indicate or be used to determine whether the participants associated with the participant metrics devices are currently participating as spectators or players in a game session. The metrics collected from spectators 160 and/or players 130 in the game environment by the participant metrics devices may be collected, aggregated, and analyzed by the participant metrics module 106. For example, the collected metrics for an individual participant or collection of participants may be analyzed to generate game inputs based at least in part on the participants' reactions to the game play. The game inputs may be provided by the participant metrics module 106 to the game engine 102. The game engine 102 may apply the game inputs generated from the participant metrics to affect the game environment, game play, and/or game players 130 in various ways. As another example, the metrics for individual participants or collection of participants may be stored, for example in a participant metrics database, as participant metrics data, and the participant metrics data may be provided to or accessed by one or more entities such as game developers for meta-analysis of games, game play, game spectating, and game environments. As another example, the collected metrics for an individual participant or collections of participants may be analyzed to generate game-related information that may be provided to game systems, game broadcasters, or other entities in real-time or near-real-time, for example to broadcasters in game tournament environments.

In some embodiments, the participant metrics devices may also include one or more indicators (e.g., display screens, lights, speakers, active surface materials, motion or thermal devices, etc.) that may, for example, be used to signal the spectators 160 and/or players 130 during game play, for example to provide feedback or alerts to the spectators 160 and/or players 130. The signals may include, but are not limited to, visual, audio, and/or haptic signals. Visual signals may, for example, include one or more of lights, surface color changes, and on-screen displays. Audio signals may, for example, include one or more of beeps, rings, tones, music, and voice. Haptic signals may, for example, include one or more of pressure, vibration, and thermal signals, or in general any signal that can be sensed through contact with or proximity to the skin or by the sense of touch. For example, the participant metrics module may analyze metrics collected from the participant metrics devices to determine supporters of a player or team that are not currently participating as spectators watching the game, and may provide a signal the participant metrics devices associated with the determined supporters to alert the respective supporters of an event in the game involving their player or team. The participant metrics devices associated with the determined supporters may provide a visual, audio, and/or haptic indication of the alert to the respective participants in response to the signal.

In some embodiments, the participant metrics devices may include wearable devices or items of clothing including but not limited to wristbands, bracelets, watches, shirts, jackets, rings, helmets, goggles, glasses, and hats or caps. In some embodiments, the participant metrics devices may instead or also include handheld devices, including but not limited to game controllers 122 that implement at least part of the participant metrics device sensing and/or signaling functionality as described herein. In some embodiments, participant metrics device sensing and/or signaling functionality may be integrated with or included in other devices such as smartphones, keyboards, cursor control devices, and remote controls, and thus these devices may be used as participant metrics devices in game environments. Non-limiting examples of participant metrics devices are described in reference to FIGS. 7A through 7D.

In some embodiments, participant metrics analysis functionality may be implemented in part on the participant metrics devices. For example, in some embodiments, at least some participant metrics devices may include a participant metrics control module that may locally perform at least some analysis of the metrics collected for respective participants (players or spectators) associated with the participant metrics devices, and that may stream or upload the analysis information to the participant metrics module 106, for example for aggregation with other analysis information and possibly further analysis to generate inputs to the game engine 102.

In some embodiments, player metrics for individual players 130 or multiple players 130 (e.g., players in groups or teams) may be collected from player metrics devices 140 and analyzed to determine, for example, the current states (e.g., emotions, moods, excitement level, stress level, anger, sadness, happiness, frustration, fear, shock, surprise, amusement, movements, gestures, position, affiliations, whether currently participating or not participating in a game, etc.) of the players/groups, and game play may be affected based on the analysis. In some embodiments, spectator metrics for individual spectators 160 or multiple spectators 160 may be collected from spectator metrics devices 170 and analyzed to determine, for example, the states (e.g., emotions, moods, excitement level, stress level, anger, sadness, happiness, frustration, fear, shock, surprise, amusement, affiliations, whether currently participating or not participating in a game, etc.) of the spectators, crowds, or groups of fans affiliated with particular players or teams, and game play for game players or teams may be affected based on the analysis. In some embodiments, the player and/or spectator metrics may be collected and analyzed by the participant metrics module 106 to determine events or states within a game based on the participants' states, and the analysis results may be used to affect the game being executed by game engine 102, for example by providing game inputs to the game engine 102 that change one or more parameters of the game.

In some embodiments, the participant metrics module 106 may signal information including but not limited to events or states within the game to the spectators 160 via the spectator metrics devices 170. Spectator 160 reactions to the signals may be measured by the spectator metrics devices 170 and provided to the participant metrics module 106. The participant metrics module 106 may analyze the spectator 160 reactions to generate game inputs to the game engine 102 that affect the game based on the spectator 160 reactions. In some embodiments, the participant metrics module 106 may signal information including but not limited to spectator states or reactions to the game or to signals sent to the spectator metrics devices 170 to the players 130 via the player metrics devices 140.

In some embodiments, the game system 100 or players 130 may generate alerts that may be signaled to the spectators 160 via the spectator metrics devices 170. For example, in some embodiments, the game engine 102 may detect a significant game event or situation involving one or more players 130 or teams of players 130, and may send an alert signal to the participant metrics module 106, which may in turn signal the alert to one or more spectators 160 via respective spectator metrics devices 170. As another example, in some embodiments, a player 130 may send an alert signal to the participant metrics module 106 via the game client on their player device 120, which may in turn signal the alert to one or more spectators 160 via respective spectator metrics devices 170. As another example, in some embodiments, a player 130 may send an alert signal to the participant metrics module 106 via their player metrics device 140, which may in turn signal the alert to one or more spectators 160 via respective spectator metrics devices 170.

FIG. 2 is a block diagram that illustrates a game system collecting metrics from participant metrics devices and providing feedback to participant metrics devices in a spectating environment, according to some embodiments. A game spectating environment as shown in FIG. 2 may include a spectating system or service 290 and one or more game systems 200. For example, one or more game systems 100 as illustrated in FIG. 1 may be implemented in the spectating environment as illustrated in FIG. 2. A game system 200 may store game data and information in a data store and implement game logic (game engine 202), and serves as an execution environment for a respective game. A game system 200 may implement one or more user interfaces (UIs) and one or more application programming interfaces (APIs) (shown as UI/API 204) to the game system functionality. As shown in FIG. 2, at least one game system 200 in the spectating environment may also implement a participant metrics module 206 as described herein.

The spectating environment may also include multiple client devices; the client devices may include player/broadcaster devices 220 and spectator devices 250. Each player/broadcaster device 220 may include, but is not limited to, input and output components and game client software for at least one online game 200 via which respective players can participate in game sessions currently being executed by the game system(s) 200. Each player/broadcaster device 220 may also include input and output components (e.g., video cameras and microphones) and broadcasting client software for the spectating service 290 via which respective players acting as broadcasters may generate live A/V streams of their online game play and commentary for broadcasting to spectators via the game spectating service 290. In some embodiments, the broadcasters may also receive spectator feedback (e.g., audio and/or textual commentary or chat) from the spectating service 290, for example via the broadcasting client software. Each spectator device 250 may include, but is not limited to, input and output components and spectating client software via which respective spectators may interact with the spectating service 290 to select, receive, and view live broadcasts from the broadcasters or playbacks of previously recorded broadcasts, and via which the spectators may provide spectator feedback (e.g. audio or textual commentary) for broadcasts.

In some embodiments, spectating service 290 may be a network-based video streaming system that may allow players to broadcast live streams of their online game play to tens, hundreds, thousands or more spectators, while allowing the spectators to select the broadcasts of particular players (also referred to as channels) for viewing. A spectating service 290 may support live broadcasts for one, two, or more different game systems 200, and may support live streaming of broadcasts from tens, hundreds, or thousands of player/broadcaster devices 220 to the spectator devices 250. In some embodiments, a spectating service 290 may record at least some live broadcasts and allow the recorded broadcasts to be played back for viewing by spectators.

While FIG. 2 shows game systems 200 as separate from spectating service 290, in some embodiments, at least one game system 200 may be implemented at least in part by spectating service 290. In some embodiments, one or more player/broadcaster devices 220 may be implemented within spectating service 290. In some embodiments, at least some components of a spectating environment as shown in FIG. 2 may be implemented in the context of a service provider that provides virtualized resources on a provider network to clients of the service provider, for example as illustrated in FIG. 10. For example, the spectating service 290 may be implemented as a service on a provider network as illustrated in FIG. 10, and one or more game systems 200 may be implemented by game providers on the provider network.

In some embodiments, a spectating service 290 may support broadcasts of live and/or recorded digital media content via player/broadcaster devices 220 from sources other than game systems 200. For example, in some embodiments, the spectating service 290 may support live or recorded broadcasts of streams from sports games, competitions, concerts, and other events including but not limited to live streams from electronic spectator sports (eSports) competitions. eSports (also referred to as competitive gaming) generally refers to organized multiplayer video game competitions. For example, video cameras and audio equipment may be installed in an arena or other venue in which an event such as a sports game or an eSports competition is being held. Video and/or audio feeds from the equipment may be input to one or more broadcaster devices 220 that may composite and stream the audio/video (A/V) inputs to the spectating service 290. For eSports events, game A/V may be added to the stream along with the feeds from the cameras and audio equipment. Commentators and/or broadcasters may input their audio, text, and/or video content into the stream as well. The live stream may be broadcast to spectator devices 250 by the spectating service 290, and/or may be recorded for rebroadcast. Spectators may view the broadcast on spectator devices 250, and may also input A/V and/or text input via the spectating service 290 clients on their devices 250.

As shown in FIG. 2, at least one game system 200 in the spectating environment may also implement a participant metrics module 206 as described herein. In some embodiments, participant metrics module 206 may include one or more computing devices, for example one or more server devices, that implement a metrics processing engine that provides metrics analysis functionality and one or more application programming interfaces (APIs) to the metrics analysis functionality. Participant metrics module 206 may also include or access other devices including but not limited to storage devices for storing metrics analysis information for individual participants (players and/or spectators), groups, crowds, and/or games including but not limited to participant metrics patterns that can be matched or mapped to individual participants' states, group or crowd states, particular game events, and so on. In some embodiments, participant metrics module 206 may be implemented as a separate system from game system 200, for example as a network-based service that is accessible by one or more entities including but not limited to the game system 200. In some embodiments, as shown in FIG. 2, participant metrics module 206 may be implemented as a component, module, or subsystem of a game system 200 in the spectating environment. FIG. 6 illustrates components and operations of an example participant metrics module 206, according to some embodiments. An example computing device that may be used in a participant metrics module 206 is illustrated in FIG. 11.

Devices, referred to herein as participant metrics devices or simply metrics devices, may, for example, be worn or held by the participants during game play when the participants are playing or spectating a game, when the participants are not actively participating in game play or game spectating, or by spectators when viewing recordings of previously played games (e.g., video on demand). The participant metrics devices may include player metrics device(s) 240 and spectator metrics device(s) 270. Note that the participant metrics devices may all be the same type of device or may include different types of devices. Each participant metrics device may include one or more sensors or other components that measure or otherwise obtain one or more participant metrics, including but not limited to physical metrics or biometrics, of the participants during game play or when the participants are not actively participating in game play. The metrics that are obtained by the participant metrics devices may include pulse, heart rate, breath, temperature, electrodermal activity, motion, position, or in general any physical or biological metric that can be measured or otherwise obtained by sensors or other components of a device worn or held by a human. The metrics that are obtained by the participant metrics devices may also include or be used to determine other data or information including but not limited to the physical location of the participants, affinity or association of the participants with particular teams, players or games (e.g., an indication of a particular player or team that a spectator is a fan of), and so on. The metrics may, for example, indicate participants' (spectators, players also acting as broadcasters, and/or players that are not also broadcasters) reactions to game play and/or game broadcasts. As another example, the metrics may indicate or be used to determine whether the participants associated with the participant metrics devices are currently participating as spectators or players in a game session or broadcast. The metrics collected from the spectators and/or players by the participant metrics devices during a game executed by the game system 200 and broadcast by the spectating service 290 may be collected, aggregated, and analyzed by the participant metrics module 206. For example, the collected metrics for an individual participant or collection of participants may be analyzed to generate game inputs based at least in part on the participants' reactions to the game play and/or broadcasts. The game inputs may be provided by the participant metrics module 206 to the game engine 202. The game engine 202 may apply the game inputs generated from the participant metrics to affect the game universe, game play, and/or game players in various ways. As another example, the metrics for individual participants or collection of participants may be stored, for example in a participant metrics database, as participant metrics data, and the participant metrics data may be provided to or accessed by one or more entities such as game developers for meta-analysis of games, game play, game spectating, and game environments. As another example, the collected metrics for an individual participant or collections of participants may be analyzed to generate game-related information that may be provided to game systems, game broadcasters, or other entities in real-time or near-real-time, for example to broadcasters in game tournament environments.

In some embodiments, the participant metrics devices 240 and/or 270 may also include one or more indicators (e.g., display screens, lights, speakers, active surface materials, motion or thermal devices, etc.) that may, for example, be used to signal the spectators and/or players during game play, for example to provide feedback or alerts to the spectators and/or players. The feedback or alerts may include, but are not limited to, visual, audio, and/or haptic signals. Visual signals may, for example, include one or more of lights, surface color changes, and on-screen displays. Audio signals may, for example, include one or more of beeps, rings, tones, music, and voice. Haptic signals may, for example, include one or more of pressure, vibration, and thermal signals, or in general any signal that can be sensed through contact with or proximity to the skin or by the sense of touch.

In some embodiments, the participant metrics devices 240 and 270 may include wearable devices or items of clothing including but not limited to wristbands, bracelets, watches, shirts, jackets, rings, helmets, goggles, glasses, and hats or caps. In some embodiments, the participant metrics devices may instead or also include handheld devices, including but not limited to game controllers that implement at least part of the participant metrics device sensing and/or signaling functionality as described herein. In some embodiments, participant metrics device sensing and/or signaling functionality may be integrated with or included in other devices such as smartphones, keyboards, cursor control devices, and remote controls, and thus these devices may be used as participant metrics devices in game environments. Non-limiting examples of participant metrics devices are described in reference to FIGS. 7A through 7D.

In some embodiments, participant metrics analysis functionality may be implemented in part on the participant metrics devices 240 and 270. For example, in some embodiments, at least some participant metrics devices 240 and 270 may include a participant metrics control module that may locally perform at least some analysis of the metrics collected for respective participants (players or spectators) associated with the participant metrics devices, and that may stream or upload the analysis information to the participant metrics module 206, for example for aggregation with other analysis information and possibly further analysis to generate inputs to the game engine 202.

In some embodiments, player metrics for individual players or multiple players (e.g., players in groups or teams) may be collected from player metrics devices 240 and analyzed to determine, for example, the current states (e.g., emotions, moods, excitement level, stress level, anger, sadness, happiness, frustration, fear, shock, surprise, amusement, affiliations, whether currently participating or not participating in a game, etc.) of the players/groups, and game play may be affected based on the analysis. In some embodiments, spectator metrics for individual spectators or multiple spectators may be collected from spectator metrics devices 270 and analyzed to determine, for example, the states (e.g., emotions, moods, excitement level, stress level, anger, sadness, happiness, frustration, fear, shock, surprise, amusement, affiliations, whether currently participating or not participating in a game, etc.) of the spectators, crowds, or groups of fans affiliated with particular players or teams, and game play for game players or teams may be affected based on the analysis. In some embodiments, the player and/or spectator metrics may be collected and analyzed by the participant metrics module 206 to determine events or states within a game executing on a game system 200 in the spectating environment based on the participants' states, and the analysis results may be used to affect the game being executed by the game system 200, for example by providing game inputs to the game engine 202 that change one or more parameters of the game.

In some embodiments, the participant metrics module 206 may signal information including but not limited to events or states within the game to the spectators via the spectator metrics devices 270. Spectator reactions to the signals may be measured by the spectator metrics devices 270 and provided to the participant metrics module 206. The participant metrics module 206 may analyze the spectator reactions to generate game inputs to the game engine 202 that affect the game based on the spectator reactions. In some embodiments, the participant metrics module 206 may signal information including but not limited to spectator states or reactions to the game or broadcasts to the players via the player metrics devices 240.

In some embodiments, the game system 200 or players may generate alerts that may be signaled to the spectators via the spectator metrics devices 270. For example, in some embodiments, the game engine 202 may detect a significant game event or situation involving one or more players or teams of players, and may send an alert signal to the participant metrics module 206, which may in turn signal the alert to one or more spectators via respective spectator metrics devices 270. As another example, in some embodiments, a player may send an alert signal to the participant metrics module 206 via the game client on their player/broadcaster device 220, which may in turn signal the alert to one or more spectators via respective spectator metrics devices 270. As another example, in some embodiments, a player may send an alert signal to the participant metrics module 206 via their player metrics device 240, which may in turn signal the alert to one or more spectators via respective spectator metrics devices 270.

While FIG. 2 shows spectator metrics being provided to the participant metrics module 206 from spectator metrics devices 270 and feedback being provided to the spectator metrics devices 270 from the participant metrics module 206 through the spectating service 290, in some embodiments at least some of the spectator metrics devices 270 may communicate with the participant metrics module 206 through wired or wireless communications that do not pass through the spectating service 290.

FIG. 3 is a block diagram that illustrates a spectating service collecting metrics for games from participant metrics devices and providing feedback from the games to participant metrics devices in a spectating environment, according to some embodiments. In some embodiments, instead of or in addition to game system(s) 200 that implement participant metrics module(s) 206 in a game spectating environment as illustrated in FIG. 2, a participant metrics module 306 may be implemented by the spectating service 390 in the game spectating environment, for example as illustrated in FIG. 3. A game spectating environment as shown in FIG. 3 may include a spectating system or service 390 and one or more game systems 300. Each game system 300 may implement game logic (game engine 302) and serves as an execution environment for a respective game. A game system 300 may provide a UI/API 304 to the game system functionality to player/broadcaster devices 320 in the game spectating environment. As was described in reference to FIG. 2, the spectating environment of FIG. 3 may include multiple client devices that include player/broadcaster devices 320 for broadcasting game play to spectators via the game spectating service 390, and spectator devices 350 for viewing the broadcasts via the game spectating service 390.

While FIG. 3 shows game systems 300 as separate from spectating service 390, in some embodiments, at least one game system 300 may be implemented at least in part by spectating service 390. In some embodiments, one or more player/broadcaster devices 320 may be implemented within spectating service 390. In some embodiments, at least some components of a spectating environment as shown in FIG. 3 may be implemented in the context of a service provider that provides virtualized resources on a provider network to clients of the service provider, for example as illustrated in FIG. 10. For example, the spectating service 390 and/or participant metrics module 306 may be implemented as services on a provider network as illustrated in FIG. 10, and one or more game systems 300 may be implemented by game providers on the provider network.

As shown in FIG. 3, the spectating service 390 may implement a participant metrics module 306 as described herein that may provide participant metrics functionality for one or more of the game systems 300 in the spectating environment. Participant metrics devices may, for example, be worn or held by the participants (spectators, players also acting as broadcasters, and/or players that are not also broadcasters) during game play. Non-limiting examples of participant metrics devices are described in reference to FIGS. 7A through 7D. The participant metrics devices may include player metrics device(s) 340 and spectator metrics device(s) 370. Each participant metrics device may include one or more sensors or other components that measure or otherwise obtain one or more participant metrics, including but not limited to physical metrics or biometrics of the participants during game play or when the participants are not actively participating in game play. The metrics that are obtained by the participant metrics devices may include any physical or biological metric that can be measured by sensors of a device worn or held by a human. The metrics that are obtained by the participant metrics devices may also include or be used to determine other data or information including but not limited to the physical location of the participants, affinity or association of the participants with particular teams, players or games (e.g., an indication of a particular player or team that a spectator is a fan of), and so on. The metrics may, for example, indicate participants' (spectators and/or players) reactions to game play and/or game broadcasts. As another example, the metrics may indicate or be used to determine whether the participants associated with the participant metrics devices are currently participating as spectators or players in a game session or broadcast. The metrics collected from spectators and/or players by the participant metrics devices during a game executed by a game system 300 and broadcast by the spectating service 390 may be collected, aggregated, and analyzed by the participant metrics module 306. For example, the collected metrics for an individual participant or collection of participants may be analyzed to generate game inputs based at least in part on the participants' reactions to the game play and/or broadcasts. The game inputs may be provided by the participant metrics module 306 to the game engine 302, for example via an API provided by the spectating system 390 or participant metrics module 306. The game engine 302 may apply the game inputs generated from the participant metrics to affect the game universe, game play, and/or game players in various ways. As another example, the metrics for individual participants or collection of participants may be stored, for example in a participant metrics database, as participant metrics data, and the participant metrics data may be provided to or accessed by one or more entities such as game developers for meta-analysis of games, game play, game spectating, and game environments. As another example, the metrics for individual participants or collections of participants may be analyzed to generate game-related information that may be provided to game systems, game broadcasters, or other entities in real-time or near-real-time, for example to broadcasters in game tournament environments.

In some embodiments, the participant metrics devices 340 and/or 370 may also include one or more indicators (e.g., display screens, lights, speakers, active surface materials, motion or thermal devices, etc.) that may be used, for example, to signal the spectators and/or players during game play, for example to provide feedback or alerts to the spectators and/or players. The signals may include, but are not limited to, visual, audio, and/or haptic signals.

In some embodiments, participant metrics analysis functionality may be implemented in part on the participant metrics devices 340 and 370. For example, in some embodiments, at least some participant metrics devices 340 and 370 may include a participant metrics control module that may locally perform at least some analysis of the metrics collected for respective participants (players or spectators) associated with the participant metrics devices, and that may stream or upload the analysis information to the participant metrics module 306, for example for aggregation with other analysis information and possibly further analysis to generate inputs to the game engine 302 of a game system 300.

In some embodiments, player metrics for individual players or multiple players (e.g., players in groups or teams) may be collected from player metrics devices 340 and analyzed to determine, for example, current states of the players/groups, and game play may be affected based on the analysis. In some embodiments, spectator metrics for individual spectators or multiple spectators may be collected from spectator metrics devices 370 and analyzed to determine, for example, states of the spectators, crowds, or groups of fans affiliated with particular players or teams, and game play for game players or teams may be affected based on the analysis. In some embodiments, the player and/or spectator metrics may be collected and analyzed by the participant metrics module 306 to determine events or states within a game executing on a game system 300 in the spectating environment based on the participants' states, and the analysis results may be used to affect the game being executed by the game system 300, for example by providing game inputs to the game engine 302 that change one or more parameters of the game.

In some embodiments, the participant metrics module 306 may signal information including but not limited to events or states within a game being executed by a game system 300 in the spectating environment to the game's spectators via respective spectator metrics devices 370. Spectator reactions to the signals may be measured by the spectator metrics devices 370 and provided to the participant metrics module 306. The participant metrics module 306 may analyze the spectator reactions to generate game inputs to the game engine 302 that affect the game based on the spectator reactions. In some embodiments, the participant metrics module 306 may signal information including but not limited to spectator states or reactions to the game or broadcasts to the players via the player metrics devices 340.

In some embodiments, a game system 300 or a game's players may generate alerts that may be signaled to the spectators via the spectator metrics devices 370. For example, in some embodiments, a game system 300 may detect a significant game event or situation involving one or more players or teams of players, and may send an alert signal to the participant metrics module 306, which may in turn signal the alert to one or more spectators via respective spectator metrics devices 370. As another example, in some embodiments, a player may send an alert signal to the participant metrics module 306 via their player/broadcaster device 320, which may in turn signal the alert to one or more spectators via respective spectator metrics devices 370. As another example, in some embodiments, a player may send an alert signal to the participant metrics module 306 via their player metrics device 340, which may in turn signal the alert to one or more spectators via respective spectator metrics devices 370.

Figure 4A:
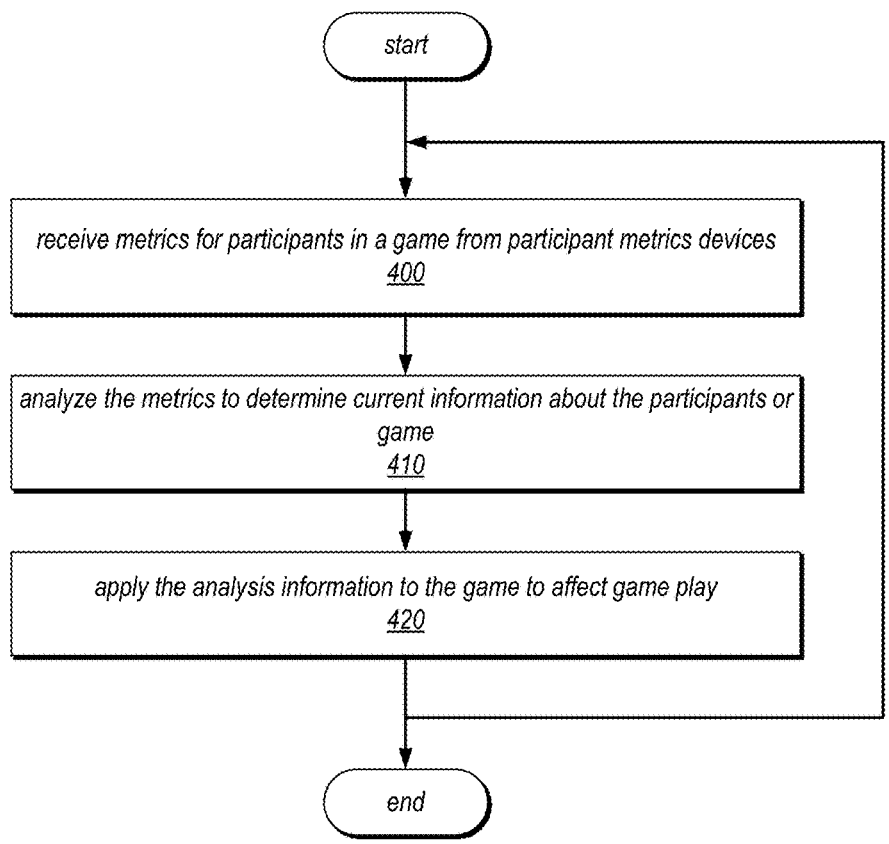
FIGS. 4A and 4B are high-level flowcharts of a method for collecting, analyzing, and applying participant metrics in a game environment, according to some embodiments.
Figure 4B:
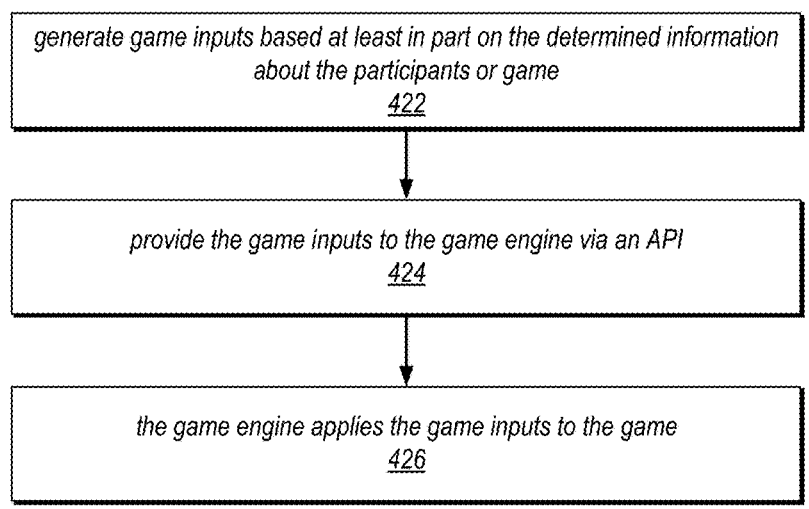

FIGS. 4A and 4B are high-level flowcharts of a method for collecting, analyzing, and applying participant metrics in a game environment, according to some embodiments. The methods of FIGS. 4A and 4B may, for example, be applied in game environments as illustrated in FIGS. 1 through 3.

FIG. 4A illustrates a method for collecting and analyzing participant metrics in a game environment, according to some embodiments. The method of FIG. 4A may, for example, be implemented by a participant metrics module as illustrated in FIGS. 1 through 3 and FIG. 6. As indicated at 400 of FIG. 4A, a participant metrics module may receive metrics for participants in a game from participant metrics devices. In some embodiments, a participant metrics module may be implemented as a component of a game system in a game environment, for example as illustrated in FIG. 1, or of game system(s) in a game spectating environment, for example as illustrated in FIG. 2. In some embodiments, a participant metrics module may be implemented by a spectating service in a game spectating environment, for example as illustrated in FIG. 3. In some embodiments, a participant metrics module may be implemented as or by an application or service external to the game system(s) and spectating service, for example as illustrated in FIG. 10. The participant metrics devices may, for example, include devices that are worn or held by participants (spectators and/or players) in a game session executing on a game system in a game environment. The participant metrics devices may, for example, be worn or held by the participants during game play when the participants are playing or spectating a game or broadcast, when the participants are not actively participating in game play or game spectating, or by spectators when viewing recordings of previously played games (e.g., video on demand). Each participant metrics device may include one or more sensors or other components that measure or otherwise obtain one or more participant metrics, including but not limited to physical metrics or biometrics of a respective participant wearing or holding the device. The metrics that are measured by the participant metrics device may include pulse, heart rate, breath, temperature, electrodermal activity, motion, position, or in general any physical or biological metric that can be measured by sensors of a device worn or held by a human. The metrics that are obtained by the participant metrics devices may also include or be used to determine other data or information including but not limited to the physical location of the participants, affinity or association of the participants with particular teams, players or games (e.g., an indication of a particular player or team that a spectator is a fan of), and so on. A participant metrics device may include a control component that communicates the sensor data collected on the device to the participant metrics module, for example via a wired or wireless connection. In some embodiments, the control component may perform some processing of the sensor data before communicating the sensor data to the participant metrics module. In some embodiments, the participant metrics device may provide the sensor data to the participant metrics module according to an API provided by the participant metrics module.

As indicated at 410 of FIG. 4A, the participant metrics module may analyze the metrics to determine current information about the game participants (players and/or spectators) or game. In some embodiments, metrics for individual players or spectators may be collected from participant metrics devices and analyzed to determine, for example, the current state (e.g., emotion, mood, excitement level, stress level, anger, sadness, happiness, frustration, fear, shock, surprise, amusement, affiliations, whether currently participating or not participating in a game, etc.) of the individual participants. In some embodiments, participant metrics for multiple players (e.g., players in groups or teams) may be collected from player metrics devices, aggregated, and analyzed by the participant metrics module to determine, for example, the current states (e.g., emotions, moods, excitement level, stress level, anger, sadness, happiness, frustration, fear, shock, surprise, amusement, affiliations, whether currently participating or not participating in a game, etc.) of the players/groups. In some embodiments, participant metrics for multiple spectators may be collected from spectator metrics devices and analyzed to determine, for example, the states (e.g., emotions, moods, excitement level, stress level, anger, sadness, happiness, frustration, fear, shock, surprise, amusement, affiliations, whether currently participating or not participating in a game, etc.) of the spectators or crowd. In some embodiments, participant metrics for multiple participants may be collected and analyzed to determine events or states within a game or within one or more broadcast channels in a game spectating system. FIG. 6 illustrates an example participant metrics module that analyzes sensor data collected from participant metrics devices in a game environment, according to some embodiments.

As indicated at 420 of FIG. 4A, the participant metrics module may apply the analysis information to the game to affect game play. In some embodiments, the participant metrics module may determine one or more game inputs based on the analysis of the metrics performed at element 410 of FIG. 4A. The game inputs may be provided by the participant metrics module to the game engine that executes the game in the game environment as controlled by the game players via respective devices that support game play. The game engine may apply the game inputs generated from the participant metrics to affect the game environment, game play, and/or game players in various ways. In some embodiments, instead of or in addition to applying the analysis information to generate game inputs, the participant metrics may be analyzed to determine whether participants associated with the participant metrics devices are currently participating as spectators or players in a game session or broadcast, and alerts or feedback may be provided to participants that are not currently participating in game play or game spectating (referred to as supporters), for example to alert supporters that are fans of particular teams or players that are currently active in a game session. In some embodiments, the metrics for individual participants or collection of participants may be stored, for example in a participant metrics database, as participant metrics data, and the participant metrics data may be provided to or accessed by one or more entities such as game developers for meta-analysis of games, game play, game spectating, and game environments. In some embodiments, the metrics for individual participants or collections of participants may be analyzed to generate game-related information that may be provided to game systems, game broadcasters, or other entities in real-time or near-real-time, for example to broadcasters in game tournament environments. FIG. 6 illustrates an example participant metrics module that applies analysis information generated from sensor data collected from participant metrics devices in a game environment, according to some embodiments. FIG. 4B illustrates a method for applying analysis information to a game in a game environment that may be used at element 420 of FIG. 4A in some embodiments.

As shown by the arrow returning from element 420 to element 400, the method of FIG. 4A may be a continuous process during execution of the game.

FIG. 4B illustrates a method for applying participant metrics in a game environment, according to some embodiments. The method of FIG. 4B may, for example, be implemented at element 420 of FIG. 4A or element 550 of FIG. 5 by a participant metrics module and game engine as illustrated in FIGS. 1 through 3 and FIG. 6. As indicated at 422 of FIG. 4B, the participant metrics module may generate game inputs based at least in part on the information that was determined about the participants or game from the analysis of the sensor data received from the participant metrics devices. As indicated at 424 of FIG. 4B, the participant metrics module may provide the game inputs to the game engine. In some embodiments, the participant metrics module may provide the game inputs to the game engine according to an API provided by the participant metrics module. As indicated at 426 of FIG. 4B, the game engine may apply the game inputs to the game to affect the game environment, game play, players, or teams of players.

Figure 5:
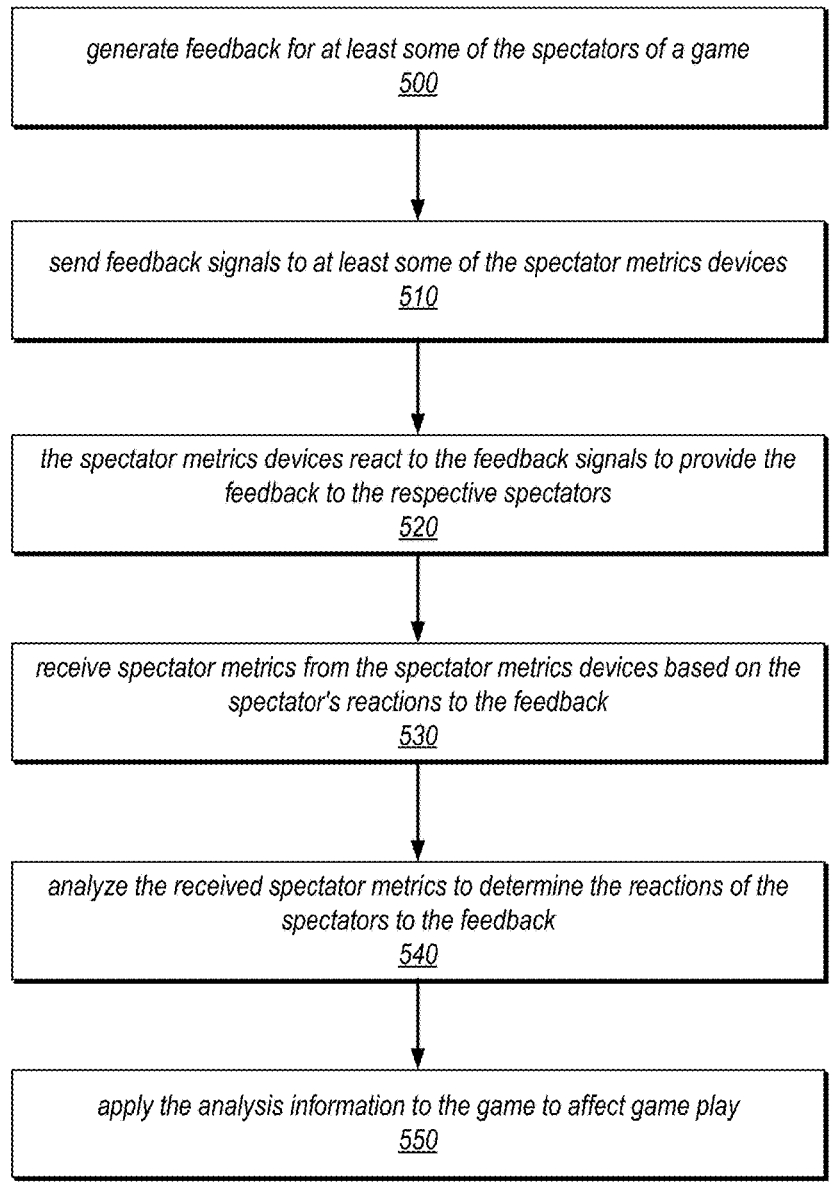
FIG. 5 is a high-level flowchart of a method for providing feedback to spectators and applying reactions of the spectators to the feedback in a game environment, according to some embodiments.

FIG. 5 is a high-level flowchart of a method for providing feedback to spectators and applying reactions of the spectators to the feedback in a game environment, according to some embodiments. The method of FIG. 5 may, for example, be applied in game environments as illustrated in FIGS. 1 through 3.

As indicated at 500 of FIG. 5, the participant metrics module may generate feedback for at least some of the spectators of a game. The feedback may, for example, be generated in response to analysis of participant metrics received from the participant metrics devices, in response to inputs to the participant metrics module from the game engine, or in response to alerts received from the player devices or player metrics devices of the game players.

As indicated at 510 of FIG. 5, the participant metrics module may send feedback signals to at least some of the spectator metrics devices. In some embodiments, the participant metrics device may receive the feedback signals from the participant metrics module according to an API provided by the participant metrics module.

As indicated at 520 of FIG. 5, the spectator metrics devices react to the feedback signals to provide the feedback or alerts to the respective spectators. In some embodiments, the spectator metrics devices may include one or more indicators (e.g., display screens, lights, speakers, active surface materials, motion or thermal devices, etc.) that may be used to provide feedback or alerts to the spectators in response to the feedback signals received from the participant metrics module. The feedback or alerts provided by the indicators may include, but are not limited to, visual, audio, and/or haptic signals. Visual signals may, for example, include one or more of lights, surface color changes, and on-screen displays. Audio signals may, for example, include one or more of beeps, rings, tones, music, and voice. Haptic signals may, for example, include one or more of pressure, vibration, and thermal signals, or in general any signal that can be sensed through contact with or proximity to the skin or by the sense of touch.

As indicated at 530 of FIG. 5, the participant metrics module may receive spectator metrics from the spectator metrics devices based on the spectator's reactions to the feedback. Each spectator metrics device may include one or more sensors or other components that measure or otherwise obtain one or more metrics of a respective spectator wearing or holding the device. The metrics that are obtained by the spectator metrics device may include pulse, heart rate, breath, temperature, electrodermal activity, motion, position, or in general any physical or biological metric that can be measured by sensors of a device worn or held by a human. The metrics that are obtained by the participant metrics devices may also include or be used to determine other data or information including but not limited to the physical location of the participants, affinity or association of the participants with particular teams, players or games (e.g., an indication of a particular player or team that a spectator is a fan of), and so on. A spectator metrics device may include a control component that communicates the sensor data collected on the device to the participant metrics module, for example via a wired or wireless connection. In some embodiments, the control component may perform some processing of the sensor data before communicating the sensor data to the participant metrics module. In some embodiments, the spectator metrics device may provide the sensor data to the participant metrics module according to an API provided by the participant metrics module.

As indicated at 540 of FIG. 5, the participant metrics module may analyze the received spectator metrics to determine the reactions of the spectators to the feedback, and may apply the analysis information within the game environment to affect game play. In some embodiments, metrics for individual spectators may be collected from spectator metrics devices and analyzed to determine, for example, the reactions or states (e.g., emotion, mood, excitement level, stress level, anger, sadness, happiness, frustration, fear, shock, surprise, amusement, affiliations, whether currently participating or not participating in a game, etc.) of the individual spectators. In some embodiments, participant metrics for multiple spectators may be collected from spectator metrics devices and analyzed to determine, for example, the reactions or states (e.g., emotions, moods, excitement level, stress level, anger, sadness, happiness, frustration, fear, shock, surprise, amusement, affiliations, whether currently participating or not participating in a game, etc.) of the spectators or crowd.

As indicated at 550 of FIG. 5, the participant metrics module may apply the analysis information generated from the spectators' reactions to the feedback to the game to affect game play. In some embodiments, a method similar to the method of FIG. 4B may be used to apply the analysis information to the game. For example, the participant metrics module may generate game inputs based at least in part on the analysis information generated from the spectators' reactions and provide the game inputs to the game engine via an API. The game engine may then apply the game inputs generated from the spectator metrics to affect the game environment, game play, and/or game players in various ways. In some embodiments, instead of or in addition to applying the analysis information to generate game inputs, the spectator metrics may be analyzed to determine whether the people associated with the spectator metrics devices are currently participating as spectators in a game session or broadcast, and may alert or provide feedback to one or more persons that are not currently participating as players or spectators, for example to alert supporters that are fans of particular teams or players that are currently active in a game session. In some embodiments, the metrics for individual spectators or collection of spectators may be stored, for example in a participant metrics database, as spectator metrics data, and the spectator metrics data may be provided to or accessed by one or more entities such as game developers for meta-analysis of games, game play, game spectating, and game environments. In some embodiments, the metrics for individual spectators or collections of spectators may be analyzed to generate game-related information (e.g., levels of support, enthusiasm, excitement, etc. among spectators for particular teams or players) that may be provided to game systems, game broadcasters, or other entities in real-time or near-real-time, for example to broadcasters in game tournament environments.

FIG. 6 is a block diagram illustrating an example participant metrics module, service, or system that collects, analyzes, and applies participant metrics in a game environment, according to some embodiments. The participant metrics module 600 of FIG. 6 may, for example, be used in game environments as illustrated in FIGS. 1 through 3. The participant metrics module 600 may, for example, be implemented in a game system as illustrated in FIGS. 1 and 2 or in a game spectating system or service as illustrated in FIG. 3. In some embodiments, the participant metrics module 600 may be implemented externally to the game system(s) or spectating system, for example as a participant metrics service in a network environment as illustrated in FIG. 10.

In some embodiments, a participant metrics module 600 may include one or more computing devices, for example one or more server devices, that implement one or more components of the participant metrics module 600. An example computing device that may be used in a participant metrics module 600 is illustrated in FIG. 11. In some embodiments, a participant metrics module 600 may include, but is not limited to, a metrics processing 602 component or module and a feedback processing 608 component or module. The participant metrics module 600 may also include or have access to a metrics data store 606 that, for example, stores data and information related to the game systems 630, models used in processing input metrics data, information related to the participant metrics devices 670, etc. In some embodiments, a participant metrics module 600 may provide a metrics device interface 610, for example an API, that exposes functionality of the participant metrics module 600 to the participant metrics devices 670, and that collects inputs from and provides outputs to the participant metrics devices 670. In some embodiments, a participant metrics module 600 may provide a game interface 604, for example an API, that exposes functionality of the participant metrics module 600 to one or more game systems 630, and that collects inputs from and provides outputs to the game systems(s) 630.

The participant metrics module 600 may obtain or receive input metrics data from participant metrics devices 670. In some embodiments, the participant metrics module 600 may also receive alerts from participant metrics devices 670, for example alerts from players of a game. Participant metrics devices 670 may, for example, include wearable or handheld devices associated with spectators, players and/or broadcaster/players as illustrated in FIGS. 1 through 3. FIGS. 7A through 7D illustrate example participant metrics devices, according to some embodiments.

The participant metrics module 600 may also receive information from game system(s) 630. In some embodiments, the game information may include alerts from a game system 630, for example alerts indicating significant events in a currently executing game. Participant metrics devices 670 may, for example, include wearable or handheld devices associated with spectators, players and/or broadcaster/players as illustrated in FIGS. 1 through 3. FIGS. 7A through 7D illustrate example participant metrics devices, according to some embodiments.

In some embodiments, metrics processing 602 component may receive input metrics data from the participant metrics devices 670 and game information from the game system(s) 630 (e.g., indications of events within the game(s)), and may generate game inputs and metrics information from the obtained data and information at least in part according to data stored in metrics data store 606. In some embodiments, metrics processing 602 component may perform analysis of the input metrics data to determine and extract information from the metrics data, and may map the information to game inputs for the game system 630. In some embodiments, metrics processing 602 component may perform the analysis at least in part according to one or more models maintained in metrics data store 606. The metrics that are measured by the participant metrics devices 670 may include one or more of pulse, heart rate, breath, temperature, electrodermal activity, motion, position, or in general any physical or biological metric that can be measured by sensors of a device worn or held by a human. The metrics that are obtained by the participant metrics devices 670 may also include or be used to determine other data or information including but not limited to the physical location of the participants, affinity or association of the participants with particular teams, players or games (e.g., an indication of a particular player or team that a spectator is a fan of), and so on.

The information extracted from the input metrics data may, for example, include information indicating current states (e.g., emotions, moods, excitement level, stress level, anger, sadness, happiness, frustration, fear, shock, surprise, amusement, movements, gestures, position, affiliations, whether currently participating or not participating in a game, etc.) for individual participants (players and/or spectators) and/or for groups of participants, and in general any relevant information that can be extracted from the metrics measured or otherwise obtained by the participant metrics devices 670. The information may, for example, be analyzed to determine participant metrics patterns for individual participants or groups of participants that can be matched or mapped to individual participants' states, group or crowd states, particular game events, and so on, for example according to the model(s) maintained in metrics data store 606 and/or the game information received from the game system(s) 630. Game inputs may be determined at least in part from the analysis of the information, for example by mapping determined participant metrics patterns or states to game input templates maintained in metrics data store 606 and/or to game events provided by the game system(s) 630. Metrics processing 602 component may output the game inputs to respective game system(s) 630. The game system(s) 630 may apply the game inputs generated from the participant metrics data to affect the game environment, game play, and/or game players in various ways. In some embodiments, metrics processing 602 component may also provide metrics information based on the analysis to feedback processing 608 component, which may for example use the provided metrics information to generate and provide feedback signals for the participant metrics devices 670.

In some embodiments, the participant metrics may be analyzed to determine whether participants associated with the participant metrics devices 670 are currently participating as spectators or players in a game session or broadcast, and alerts or feedback may be provided to participants that are not currently participating as players or spectators, for example to alert supporters that are fans of particular teams or players that are currently active in a game session. In some embodiments, the metrics for individual participants or collection of participants may be stored, for example in a participant metrics database, as participant metrics data, and the participant metrics data may be provided to or accessed by one or more entities such as game developers for meta-analysis of games, game play, game spectating, and game environments. In some embodiments, the metrics for individual participants or collections of participants may be analyzed to generate game-related information that may be provided to game systems, game broadcasters, or other entities in real-time or near-real-time, for example to broadcasters in game tournament environments.

In some embodiments, metrics processing 602 component may apply an emotion recognition technique to one or more physical metrics in analyzing and determining emotion or mood for individuals or groups of participants. In some embodiments, the emotion recognition technique may be a statistical pattern recognition technique that compares the physical metrics to known or learned patterns for individual participants or groups of participants according to one or more models maintained in metrics data store 606 to determine states, emotions, or emotional states (e.g., excitement, stress, fear, shock, surprise, amusement, anger, sadness, happiness, frustration, affiliations, whether currently participating or not participating in a game, etc.) for participants or groups of participants from the participants' physical metrics patterns. In various embodiments, for example, a Maximum Likelihood Bayes classifier (MLB), Kernel Regression (KR), or K-nearest neighbors (KNN) statistical pattern recognition technique may be used. Note, however, that other types of emotion recognition techniques may be used.

In some embodiments, the models and patterns may map the detected emotions or moods to known or learned patterns maintained in metrics data store 606 to determine information about participants, games, and/or broadcasts from the input participant metrics data. The patterns may include, but are not limited to, emotion patterns corresponding to particular emotions or emotional states for individuals, groups, and crowds in game environments. The determined information may include one or more of, but is not limited to: information identifying current emotions or emotional states for particular participants or groups of participants (players, teams of players, broadcasters, and/or spectators); information identifying particular players or teams of players of interest (e.g., "hot" teams or "hot" players) in games; information identifying active or popular players/teams, broadcasters, games, and/or broadcasts; information identifying events in games and/or broadcasts; and in general any information that can be determined for participants, games, and/or broadcasts from the metrics data collected from participants as described herein.

In some embodiments, at least some of the patterns may be generic to spectators, players, games and/or broadcasts, and the metrics data may, for example, be mapped to general events or general types of events in games and/or broadcasts according to the patterns. In some embodiments, at least some of the metrics data may be specific to particular games, and the metrics data may, for example, be mapped to particular events or types of events within the games according to the game-specific patterns. In some embodiments, metrics processing 602 component may maintain models and patterns as metrics data store 606, and may access the models and patterns from the metrics data store 606 when processing the metrics data. Some embodiments may use participant-independent techniques that are designed to generally recognize anyone's emotions or moods based on analysis of the metrics data according to the models and patterns. However, some embodiments may use participant-dependent techniques. In either case, the data sets and models may be initialized or trained, and the patterns for individuals or groups may be learned or improved over time.

In some embodiments, the participant metrics module 600 may use feedback and machine learning techniques to train and improve the data sets used in extracting information from the input metrics data, recognizing emotions or mood from the extracted information, and mapping the emotions or moods to the patterns. For example, in embodiments that use participant-independent techniques, the data sets may be initialized by collecting a corpus of physical or biological metrics examples from the participant metrics devices 670 of many individuals and developing statistical models from the corpus of examples. The data sets may be improved over time, for example by adding new samples obtained during usage of participant metrics devices 670 in game environments to the statistical model, or by receiving feedback from the participants to indications of participants' emotions as recognized by the participant metrics module 600.

In embodiments that use participant-dependent techniques, the participant metrics module 600 may create and maintain data sets for individual participants that may be used in recognizing emotions and moods for the individuals. In some embodiments, a participant's data set may be initially trained by the participant, for example by exhibiting different emotions in response to stimuli while wearing or holding a participant metrics device 670 so that the participant metrics module 600 can analyze how the participant reacts to stimuli and establish a baseline for the participant. As the participant uses the participant metrics device 670 over time, additional samples of the participant's physical metrics data may be used to improve or refine the participant's data set. Further, the participant may provide additional feedback to improve the quality of the emotion recognition. For example, the participant metrics device 670 may visually indicate a participant's emotions as recognized by the participant metrics module 600, and the participant may be asked if its interpretations of the participant's physical metrics are correct. The participant may respond, and the response may be used to improve the participant's data set.

In some embodiments, feedback processing 608 component may receive metrics information from the metrics processing 602 component, game information from the game system(s) 630 (e.g., indications of events within the game(s), alerts generated by the game engines or player devices, etc.), and alerts from player metrics devices 670, and may generate output signals for the participant metrics devices 670 from the obtained data and information at least in part according to data stored in metrics data store 606. For example, in some embodiments, feedback processing 608 component may receive metrics information from the metrics processing 602 component indicating individual or group reactions to particular game events, and may generate feedback signals for one or more participant metrics devices 670 that cause the participant metrics devices 670 to provide indications of the reactions to respective participants. As another example, in some embodiments, feedback processing 608 component may receive an alert from a player metrics device 670, and may generate a feedback signal to spectator metrics devices 670 of a group of spectators (e.g., fans) associated with the respective player. As another example, in some embodiments, feedback processing 608 component may receive an alert from a game system 630, and may generate a feedback signal to one or more participant metrics devices 670 associated with players and/or spectators of the respective game.

In some embodiments, metrics data of two or more different types collected from one or more participants may be analyzed by the metrics processing 602 component in combination to generate game inputs and metrics information. For example, metrics data indicating participants' pulse or heartrate may be used in combination with metrics data indicating breath rate, temperature, and/or electrodermal activity to estimate a current mood or emotion of participant(s).

In some embodiments, sensor data indicating motion and/or position of the participants may be collected by the participant metrics devices 670, and may be analyzed by the metrics processing 602 component to generate game inputs and metrics information. For example, the metrics processing 602 component may receive metrics data indicating motions detected by motion detection sensors of a bracelet or wristband as illustrated in FIG. 7B, and may determine from the metrics data that the participants have raised their arms, or made some other gesture, and game inputs and/or metrics information may be generated in response to the detected gestures.

FIGS. 7A through 7D illustrate example participant metrics devices, according to some embodiments. The participant metrics devices of FIGS. 7A through 7D may, for example, be used in game and spectating environments as illustrated in FIGS. 1 through 3 and FIG. 6.

Figure 7A:
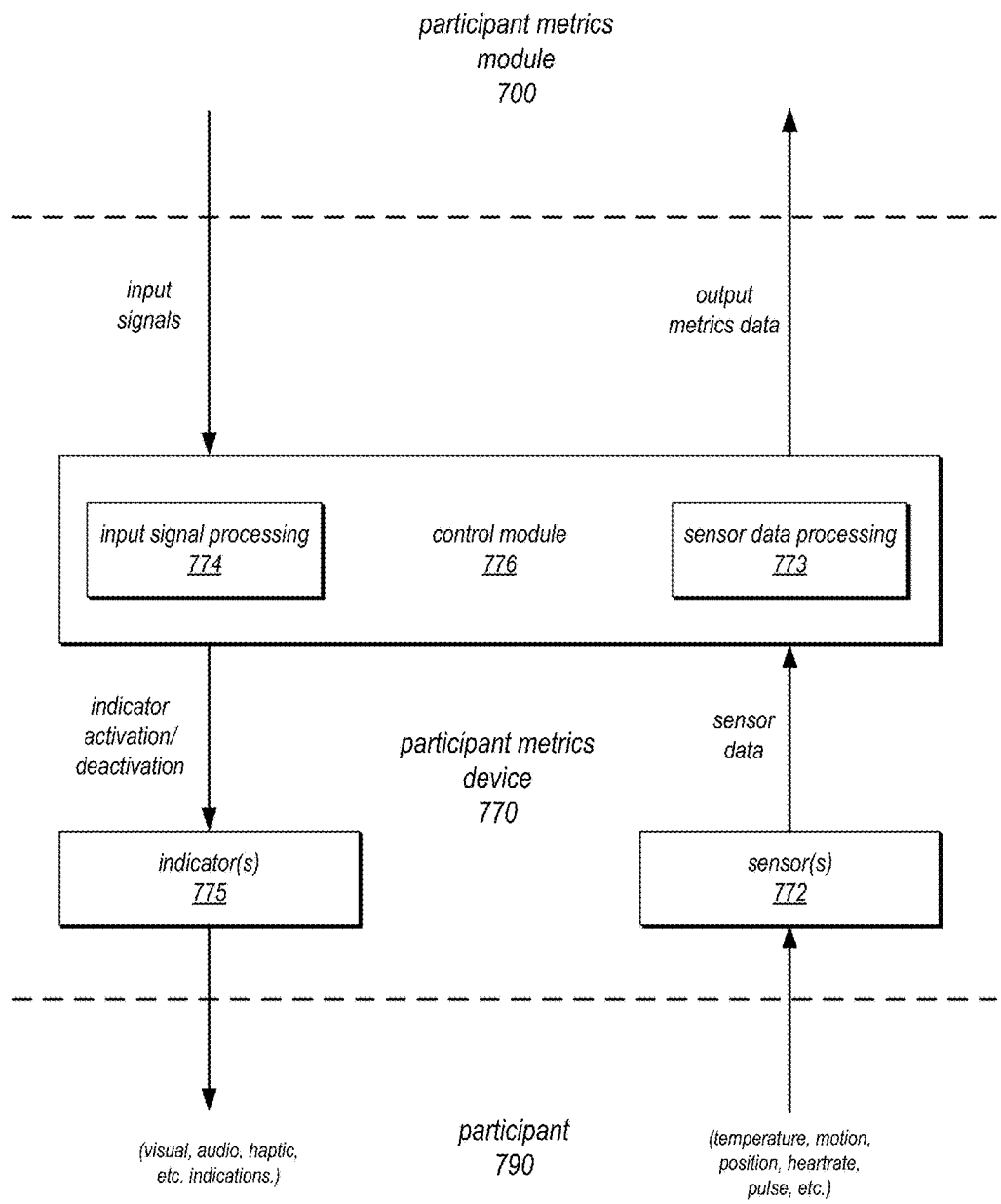
FIGS. 7A through 7D illustrate example participant metrics devices, according to some embodiments.
Figure 7B:
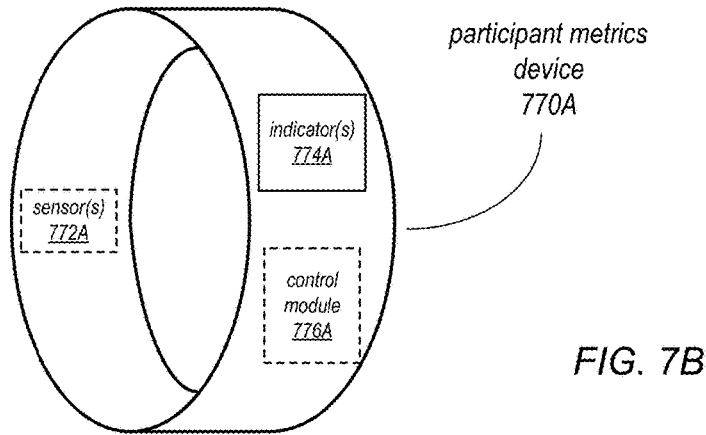

FIG. 7A is a block diagram illustrating components of an example participant metrics device 770, according to some embodiments. A participant metrics device 770 may, for example, be worn or held by a participant 790 (a spectator or player) in a game during game play. A participant metrics device 770 may include one or more sensors 772 or other components that measure or otherwise obtain one or more participant metrics including but not limited to physical metrics of the participant 790 during game play. The participant metrics that are measured by the sensor(s) 772 may include one or more of pulse, heart rate, breath rate, temperature, electrodermal activity, motion, position, or in general any physical or biological metric that can be measured by sensors 772 of a device 770 worn or held by a human. The metrics that are obtained by the participant metrics devices may also include or be used to determine other data or information including but not limited to the physical location of the participants, affinity or association of the participants with particular teams, players or games (e.g., an indication of a particular player or team that a spectator is a fan of), and so on. The metrics may, for example, indicate the participant 790's reactions to game play. As another example, the metrics may indicate or be used to determine whether the participant is or is not currently participating as a spectator or player in a game session.

In some embodiments, a participant metrics device 770 may also include one or more indicators 775 (e.g., display screens, lights, speakers, active surface materials, motion or thermal devices, etc.) that may be used to signal the participant 790 during game play, for example to provide feedback or alerts to the participant 790. The feedback to the participant 790 may include, but are not limited to, visual, audio, and/or haptic signals. Visual signals may, for example, include one or more of lights, surface color changes, and on-screen displays. Audio signals may, for example, include one or more of beeps, rings, tones, music, and voice. Haptic signals may, for example, include one or more of pressure, vibration, and thermal signals, or in general any signal that can be sensed through contact with or proximity to the skin or by the sense of touch.

In some embodiments, the participant metrics device 770 may also include a control module 776 that collects sensor data from the sensor(s) 772 and communicates metrics data to a participant metrics module 700, for example via wired and/or wireless network connections and network protocols. The control module 776 may, for example, include one or more processors. In some embodiments, the control module 776 may include a sensor data processing 773 component that receives sensor data from the sensor(s) 772, processes the sensor data to generate metrics data, and outputs the metrics data to the participant metrics module 700. For example, the sensor data processing 773 component may collect sensor data from a sensor 772 over time, and may aggregate, normalize, average, or otherwise process the sensor data to generate a metrics data reading for the sensor 772 that is output to the participant metrics module 700. In some embodiments, patterns for the participant 790's sensor data may be maintained and locally stored by the participant metrics device 770 that map the sensor data to emotions or moods, and the sensor data may be analyzed according to the participant 790's patterns to generate metrics data that, for example, indicates an emotion or mood of the respective participant 790.

In some embodiments, sensor data from two or more sensors 772 may be analyzed by the sensor data processing 773 component in combination to generate metrics data. For example, pulse or heartrate may be used in combination with breath rate, temperature, and/or electrodermal activity to estimate a current mood or emotion of the participant 790.

In some embodiments, sensor data indicating motion and/or position of the participant 790 may be collected from one or more sensors 772, and may be analyzed by the sensor data processing 773 component to generate metrics data indicating a gesture or position of the participant 790. For example, the sensor data processing 773 component may receive sensor data from a motion detection sensor of a bracelet or wristband as illustrated in FIG. 7B, and may determine from the sensor data that the participant has raised their arm, or made some other gesture, and an indication of the detected gesture may be provided to the participant metrics module 700 as metrics data.

In some embodiments, the control module 776 may also receive input signals from the participant metrics module 700 or from other sources, for example via wired and/or wireless network connections and network protocols, and may provide the signals to one or more indicators 775 of the participant metrics device 770. In some embodiments, the control module 776 may include an input signal processing 774 component that receives the input signals, processes the input signals to determine appropriate feedback or alerts for the participant 790, and activates, modifies, or deactivates one or more indicators 775 to provide the feedback or alerts to the participant 790.

In some embodiments, a participant metrics device 770 may be associated or affiliated with particular games, teams, or players. For example, fans of team A may obtain participant metrics devices 770 that are associated with team A, and fans of team B may obtain participant metrics devices 770 that are associated with team B. As another example, fans of a particular player may obtain and wear participant metrics devices 770 associated with that particular player. As another example, participant metrics devices 770 may be associated with particular games or game titles. In some embodiments, one or more mechanisms may be provided that may be used by a participant to change the player, team, or game that their participant metrics device 770 is associated with. In some embodiments, the player, team, or game that a participant metrics device 770 is associated with may be automatically changed in response to a respective participant's actions, for example in response to a spectator or player announcing that he or she is switching team affiliations in a chat window of a game system or spectating system interface. The metrics collected from the participant metrics devices 770 may thus indicate the affiliations of particular participants with, or the support of particular participants for, particular teams, players, or games.

Figure 7C:
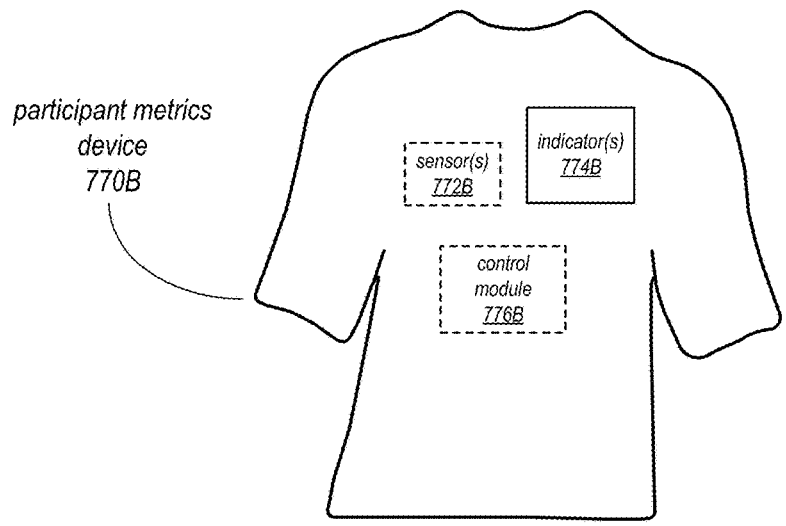
Figure 7D:
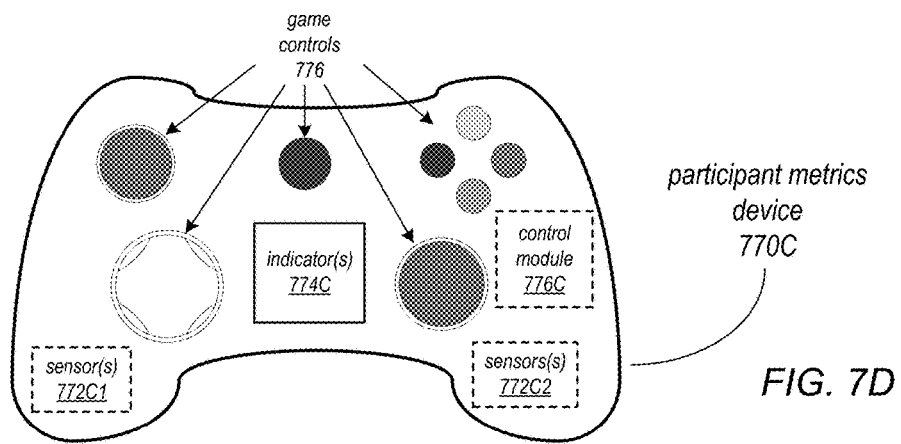

FIGS. 7B through 7D illustrate some non-limiting examples of wearable or handheld participant metrics devices, according to some embodiments. In some embodiments, participant metrics devices 770 may include wearable devices or items of clothing including but not limited to wristbands, bracelets, watches, shirts, jackets, rings, helmets, goggles, glasses, and hats or caps. In some embodiments, participant metrics devices 770 may instead or also include handheld devices, including but not limited to game controllers that implement at least part of the participant metrics device sensing and/or signaling functionality as described herein. In some embodiments, participant metrics device sensing and/or signaling functionality may be integrated with or included in other devices such as smartphones, keyboards, cursor control devices, and remote controls, and thus these devices may be used as participant metrics devices in game environments as described herein.

FIG. 7B illustrates an example wristband, bracelet, watch, or the like 770A that implements participant metrics device sensing and/or signaling functionality as described herein, and that includes one or more sensors 772A, one or more indicators 774A, and a control module 776A, for example as illustrated in FIG. 7A. FIG. 7C illustrates an example shirt, jacket, or the like 770B that implements participant metrics device sensing and/or signaling functionality as described herein, and that includes one or more sensors 772B, one or more indicators 774B, and a control module 776B, for example as illustrated in FIG. 7A. FIG. 7D illustrates an example game controller that includes game controls 776 and other components for controlling a game and that acts as a participant metrics device 770C when held by a player. The game controller 776C and implements participant metrics device sensing and/or signaling functionality as described herein, and includes one or more sensors 772C1 and 772C2, one or more indicators 774C, and a control module 776C, for example as illustrated in FIG. 7A.

Figure 8A:
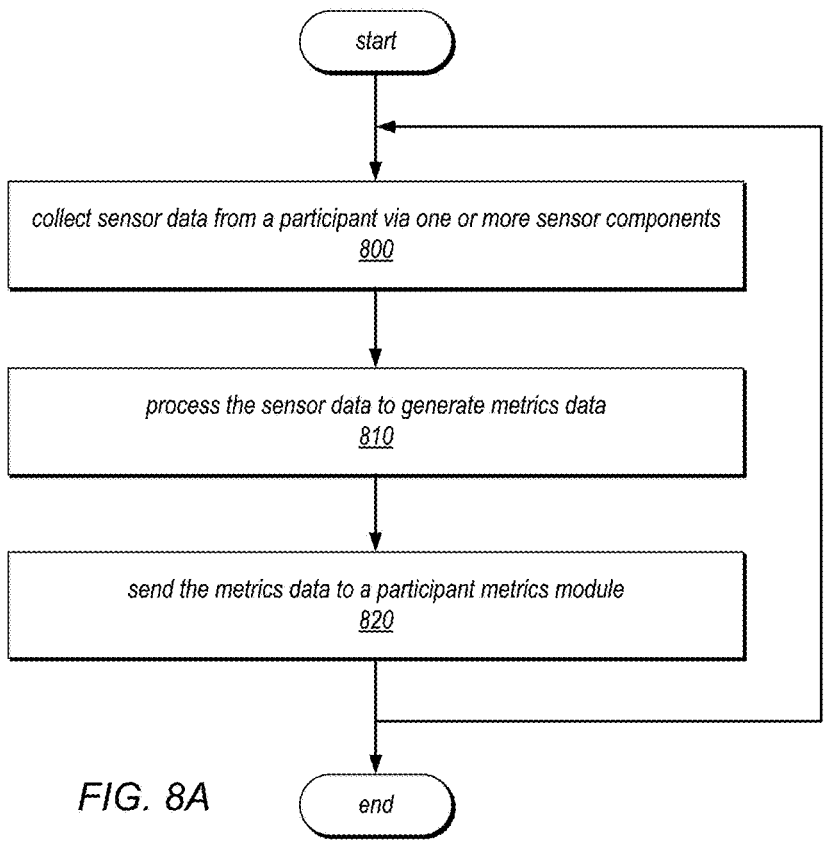
FIGS. 8A and 8B illustrate methods of operation for participant metrics devices in a game environment, according to some embodiments.
Figure 8B:
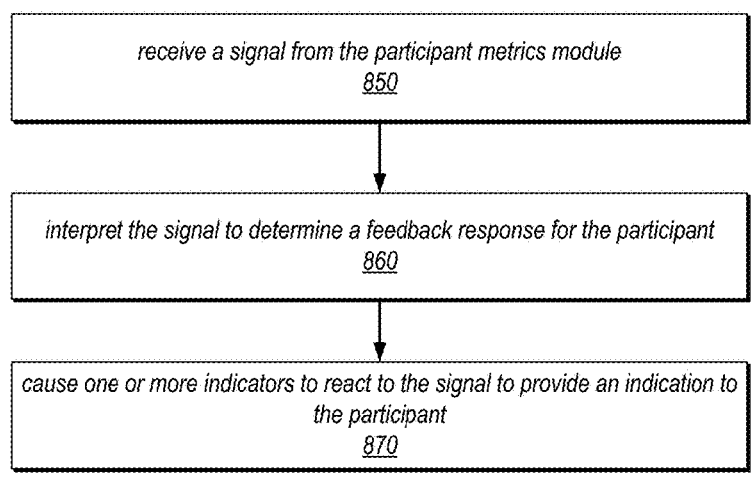

FIGS. 8A and 8B illustrate methods of operation for participant metrics devices in a game environment, according to some embodiments. The methods of FIGS. 8A and 8B may, for example, be implemented by participant metrics devices as illustrated in FIGS. 1 through 3, FIG. 6, and FIGS. 7A through 7D.

FIG. 8A illustrates a method for providing participant metrics to a participant metrics module, according to some embodiments of a participant metrics device. The method of FIG. 8A may, for example, be implemented by a participant metrics device 770 as illustrated in FIGS. 7A through 7D. As indicated at 800 of FIG. 8A, the participant metrics device 770 may collect sensor data from a participant via one or more sensors, for example sensors as illustrated in FIGS. 7A through 7D. As indicated at 810 of FIG. 8A, the participant metrics device 770 may process the collected sensor data to generate metrics data, for example as described in reference to FIG. 7A. As indicated at 820 of FIG. 8A, the participant metrics device 770 may send the metrics data to a participant metrics module 700, for example via a wired or wireless network connection as described in reference to FIG. 7A. As shown by the arrow returning from element 820 to element 800, the method of FIG. 8A may be a continuous process during execution of the game.

FIG. 8B illustrates a method for processing signals from a participant metrics module, according to some embodiments of a participant metrics device. The method of FIG. 8B may, for example, be implemented by a participant metrics device 770 as illustrated in FIGS. 7A through 7D. As indicated at 850 of FIG. 8B, the participant metrics device 770 may receive a signal from the participant metrics module 700. As indicated at 860 of FIG. 8B, the participant metrics device 770 may interpret the signal to determine an appropriate indication or feedback for the respective participant 790, for example as described in reference to FIG. 7A. As indicated at 860 of FIG. 8B, the participant metrics device 770 may cause one or more indicators to react to the signal to provide the indication or feedback to the participant 790, for example as described in reference to FIG. 7A.

Figure 9:
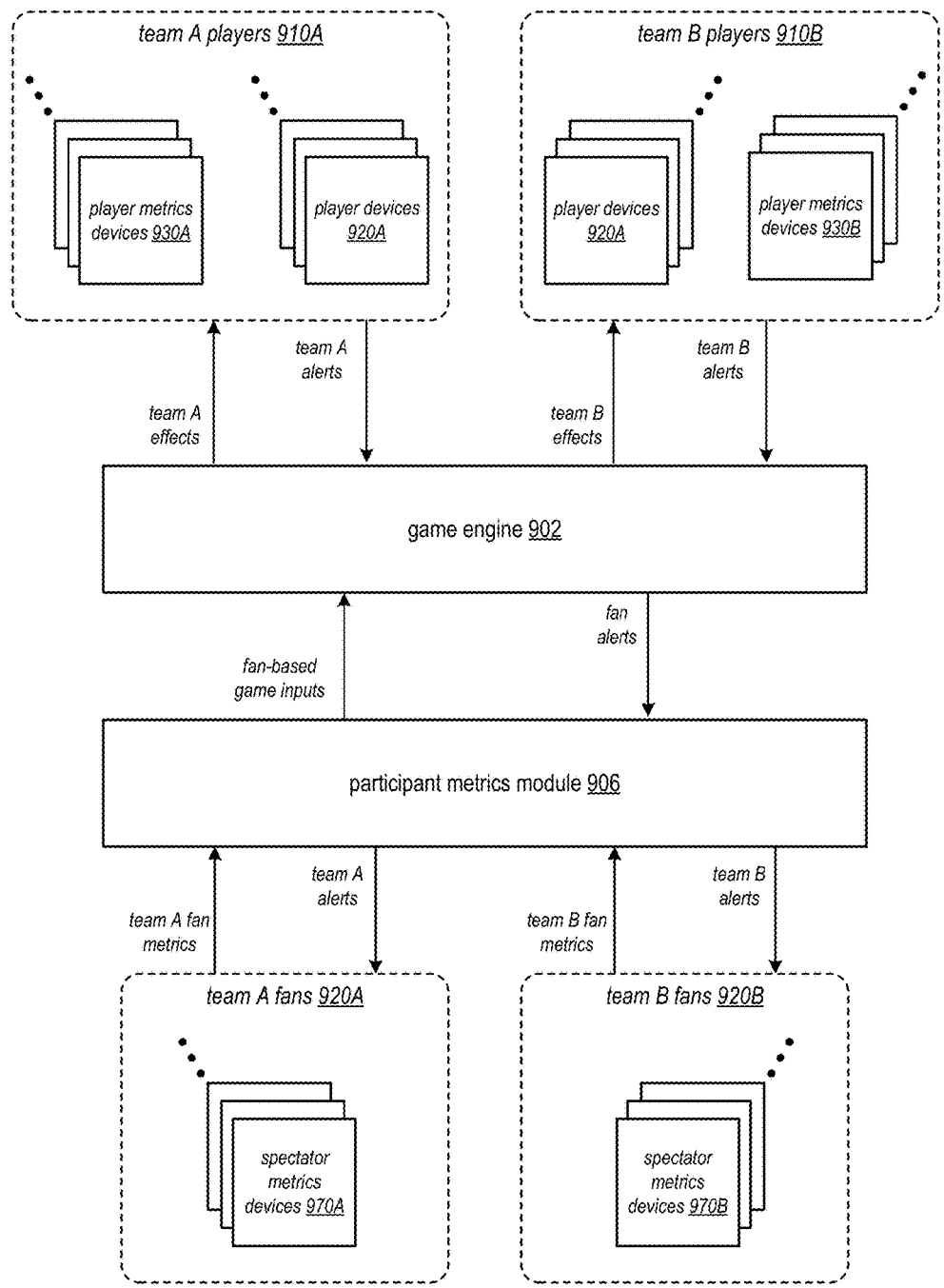
FIG. 9 illustrates an example use case in which spectators affect game play via spectator metrics devices, according to some embodiments.

FIG. 9 illustrates an example use case in which spectators may affect game play in a game environment via spectator metrics devices, according to some embodiments. In this example, a game being executed by a game engine 902 is being played by two or more teams of players via respective player devices 920A and 920B, shown as team A players 910A and team B players 910B. Each team 910A and 910B may have a group of spectators that are fans of the teams, shown as team A fans 920A and team B fans 920B. Participant metrics module 906 may collect spectator metrics data from spectator metrics devices 970, and may categorize the metrics data according to spectator metrics devices 970A and 970B to generate fan-based game inputs according to team A's fans 920A and team B's fans 920B. Game engine 902 may then affect team A players 910A and/or team B players 910B according to the fan-based game inputs. For example a high level of emotion or excitement detected for team A's fans 920A may result in the game engine 902 positively affecting team A players 910A and/or negatively affecting team B players 910B, for example by providing an energy boost or special weapon or power to team A, or by reducing team B's powers or removing weapons from team B.

As another example, team A players 910A and team B players 910B may generate alerts for their respective fans 920A and 920B, for example via respective player devices 920A or via player metrics devices 930A and 930B. As shown in FIG. 9, the alerts may be provided to the game engine 902, which may send fan alerts to the participant metrics module 906, which in turn may send appropriate alert signals to the spectator metrics devices 970A and/or 970B. Alternatively, alerts may be sent from player devices 920 or player metrics devices 930 directly to the participant metrics module 906, or directly to spectator metrics devices 970. In some embodiments, game engine 902 may also generate alerts based on game play. The spectator metrics devices 970A and/or 970B may then provide indications of the alerts to the fans 920A and/or 920B. The fans 920A and/or 920B may react to the indications, their reactions may be sensed by the spectator metrics devices 970A and/or 970B, and metrics indicating the reactions may be provided to the participant metrics module 906. The participant metrics module 906 may generate fan-based game inputs based on the reactions, and provide the game inputs to the game engine 902. The game engine 902 may then affect the team(s) according to the fans' reactions to the alerts.

As an example, an alert may be sent to spectators requesting that the spectators raise their arms if they support team A 910A or team B 910B. Spectator metrics devices 970 may sense motion of the spectators, and convey that information as metrics data to the participant metrics module 906. The participant metrics module 906 may analyze the metrics data to determine which team has the most support, for example by determining how many fans reacted for each team. The participant metrics module 906 may then provide a game input to the game engine 902 that indicates, for example, that the majority of fans currently support team A. The game engine 902 may then positively affect team A players 910 and/or negatively affect team B players 910 in response to the game input.

Example Online Gaming Network Environments

FIG. 10 illustrates example network-based game and game spectating environments, according to some embodiments. Embodiments of game systems, spectating systems or services, and/or participant metrics modules, services, or systems that implement the methods and apparatus for collecting, analyzing, and applying participant metrics in game environments as described herein in reference to FIGS. 1 through 9 may be implemented in the context of a service provider that provides virtualized resources (e.g., virtualized computing resources, virtualized storage resources, virtualized database (DB) resources, etc.) on a provider network 1990 to clients of the service provider, for example as illustrated in FIG. 10. Virtualized resource instances may be provisioned via one or more provider network services 1992, and may be rented or leased to the clients of the service provider, for example to developer 1970 clients that develop and provide game systems 1900 or other systems or services via the provider network 1990 and services 1992.

In some embodiments, one or more developers 1970 may access one or more of services 1992 of the provider network 1990 via application programming interfaces (APIs) to the services 1992 to configure a game system 1900, participant metrics service 1910, and/or game spectating service 1930 on the provider network 1990. A game system 1900, participant metrics service 1910, or game spectating service 1930 may include multiple virtualized resource instances (e.g., computing resources, storage resources, DB resources, etc.) that implement the components of the respective services on the provider network 1990.

At least some of the resource instances on the provider network 1990 (e.g., computing resources) may be implemented according to hardware virtualization technology that enables multiple operating systems to run concurrently on a host computer, for example as virtual machines (VMs) on the host. In some embodiments, the provider network 1990, via the services 1992, may enable the provisioning of logically isolated sections of the provider network 1990 to particular clients as client private networks on the provider network 1990. At least some of a client's resources instances on the provider network 1990 may be provisioned in the client's private network. For example, in FIG. 10, one or more game systems 1900 may be implemented as or in private networks of respective developers 1970 that are provisioned on provider network 1990 via one or more of the services 1992. As another example, a participant metrics service 1910 and a game spectating service 1930 may be provisioned in private networks on provider network 1990 via one or more of the services 1992.

The provider network 1990, via the services 1992, may provide flexible provisioning of resource instances to clients in which virtualized resource instances can be automatically added to or removed from a configuration on the provider network 1990 in response to changes in demand or usage, thus enabling an implementation on the provider network 1990 to automatically scale to handle computation and/or storage needs. For example, one or more additional computing and/or storage resources may be automatically added to a game system 1900, to participant metrics service 1910, and/or to game spectating service 1930 in response to an increase in game playing, broadcasting, and/or game spectating from player/broadcaster devices 1920 and/or spectator devices 1980. Conversely, if and when usage drops below a threshold, resources can be removed from a game system 1900, participant metrics service 1910, and/or game spectating service 1930.

In some embodiments, players and player/broadcasters may access game system(s) 1900 on provider network 1990 via an intermediate network 1950 such as the Internet using broadcaster/player devices 1920 to play games executed on the game system(s) 1900. In some embodiments, player/broadcasters may stream broadcasts of their game play via game spectating service 1930 for viewing by spectators on respective spectator devices 1980. Alternatively, spectators may access the game system(s) 1900 via game clients on their devices 1980 to view game play on the game system(s) 1900 through the intermediate network 1950. At least some of the players, player/broadcasters, and/or spectators may wear or hold participant metrics devices 1960 when playing or viewing a game executing on a game system 1900. The participant metrics devices 1960 may collect sensor data from the participants during game play, and may provide metrics data generated from the sensor data to the participant metrics service 1910. The participant metrics service 1910 may receive the metrics data from the participant metrics devices 1960 via the intermediate network 1950, generate game inputs according to the collected metrics data, and provide the game inputs to respective games executing on the game systems 1900. The game systems 1900 may apply the game input to affect the games and/or players in the game in various ways as described herein.

Game Development Environments

In some embodiments, game developers may be provided with a set of development tools, for example a toolkit, integrated development environment (IDE), and/or software development kit (SDK), that provide libraries and APIs to enable the developers to develop game code that integrates the participant metrics devices and the physical metrics of participants collected from the participant metrics devices into their game systems under development. The tool set may, for example, be provided as a component of a game development framework that provides development tools for other game functionality. For example, a service provider that provides a provider network 1990 as illustrated in FIG. 10 may provide a tool set as part of a game development framework to developers 1970 for integrating participant metrics as described herein in game systems 1900 developed for deployment on the provider network 1990. The tool set may provide mechanisms (e.g., libraries, APIs, etc.) whereby a developer can obtain, process, and map particular participant metrics collected by a participant metrics module from the participant metrics devices to particular game content and/or game effects.

For example, a tool set may be provided via which developers can map participant metrics described by the tool set such as pulse, heart rate, breath, temperature, electrodermal activity, motion, and position to particular game characters (either player controlled or AI controlled), teams of characters, objects, environmental conditions, and so on, and to particular effects on the content. As an example, the developer may map biometric inputs from players to their corresponding characters within the game, and define the effects that the inputs have on the characters. As another example, the developer may map biometric inputs from game spectators to particular game characters that the spectators are currently supporting, and define the effects that the inputs have on the game characters or their opponents.

Illustrative System

In some embodiments, a computing device that implements a portion or all of the methods and apparatus for collecting, analyzing, and applying participant metrics in game environments as described herein may include a general-purpose computer system that includes or is configured to access one or more computer-accessible media, such as computer system 2000 illustrated in FIG. 11. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for collecting, analyzing, and applying participant metrics in game environments, are shown stored within system memory 2020 as code 2025 and data 2026.

In some embodiments, I/O interface 2030 may be configured to coordinate I/O traffic between processor 2010, system memory 2020, and any peripheral devices in the device 2000, including network interface 2040, input/output (I/O) devices, or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, I/O interface 2030 may support one or more input/output peripheral devices or components 2070 of system 2000, such as cursor control, keyboard, display, video, and/or audio I/O devices 2070 or components. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into at least one processor 2010.

Network interface 2040 may be configured to allow data to be exchanged between computer system 2000 and other devices 2060 attached to a network or networks 2050, such as other computer systems or devices as illustrated in FIGS. 1 through 10, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 10 for implementing embodiments of methods and apparatus for collecting, analyzing, and applying participant metrics in game environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement a game engine that executes a game as controlled by a plurality of players via respective devices; and
at least one computing device configured to implement a participant metrics module configured to:
receive spectator metrics input indicating one or more metrics for a plurality of spectators of the game from a plurality of spectator metrics devices associated with the plurality of spectators of the game, wherein the one or more metrics include physical metrics indicating spectator reactions to the game;
analyze the spectator metrics input to generate one or more game inputs for the game based on the spectator reactions to the game; and
provide the one or more game inputs based on the spectator reactions to the game to the game engine, wherein the one or more game inputs affect execution of the game by the game engine, and wherein the one or more game inputs are applied by the game engine to affect one or more of an in-game character, a team of in-game characters, an in-game object, or an in-game environmental condition.

2. The system as recited in claim 1, wherein the participant metrics module is further configured to:
   receive game information from the game engine;
   analyze the game information to generate game feedback signals for the spectators; and
   provide the game feedback signals to the plurality of spectator metrics devices, wherein the plurality of spectator metrics devices are configured to provide indications to the spectators according to the feedback signals, wherein the indications include one or more of visual, audio, or haptic indications.

3. The system as recited in claim 1, wherein the participant metrics module is further configured to:
   receive player metrics input indicating one or more physical metrics for the players of the game from a plurality of player metrics devices associated with the plurality of players of the game, wherein the physical metrics indicate player reactions to the game;
   analyze the player metrics input to generate one or more game inputs for the game based on the player reactions to the game; and
   provide the one or more game inputs based on the player reactions to the game to the game engine, wherein the one or more game inputs affect execution of the game by the game engine.

4. The system as recited in claim 1, wherein, to analyze the spectator metrics input to generate one or more game inputs for the game based on the spectator reactions to the game, the participant metrics module is further configured to:
   determine and analyze spectator metrics input from spectator metrics devices of spectators that are fans of particular players or teams of players; and
   generate player or team game inputs for the game that affect the particular players or teams of players based on the analysis of the spectator metrics input from the spectator metrics devices of the spectators that are fans of the particular players or teams of players.

5. The system as recited in claim 4, wherein a player or team game input generated from analysis of the spectator metrics input from the spectator metrics devices of spectators that are fans of a particular player or team of players positively affects game play for the particular player or team of players or negatively affects game play for at least one other player or team of players.

6. The system as recited in claim 1, wherein the participant metrics module is further configured to:
   receive player input indicating an alert from a device associated with one of the plurality of players of the game; and
   provide a signal to one or more of the plurality of spectator metrics devices in response to the alert, wherein the one or more spectator metrics devices are configured to provide an indication of the alert to respective spectators according to the signal, wherein the indication includes one or more of a visual, audio, or haptic indication.

7. The system as recited in claim 1, wherein the participant metrics module is further configured to:
   generate and store information for the game based on the spectator reactions to the game; and
   provide at least part of the generated information to a broadcaster device associated with a game broadcaster for display.

8. A method, comprising:
   receiving, by a participant metrics module from a participant metrics device associated with a spectator of a game involving one or more game players, metrics input indicating one or more metrics of the spectator as captured by the participant metrics device;
   analyzing, by the participant metrics module, the one or more metrics of the spectator as indicated by the metrics input to determine a state of the spectator;
   generating information for the game according to the determined state of the spectator; and
   providing at least part of the information to one or more devices including a game system that executes the game, wherein the information provided to the game system includes one or more game inputs to affect the game executing on the game system, wherein the one or more game inputs are applied by the game system to affect one or more of an in-game character, a team of in-game characters, an in-game object, or an in-game environmental condition.

9. The method as recited in claim 8, wherein the one or more devices include a broadcaster device associated with a game broadcaster, the method further comprising displaying the information on the broadcaster device for viewing by the game broadcaster.

10. The method as recited in claim 8, wherein the participant metrics device is one of a wearable device or a handheld device.

11. The method as recited in claim 8, wherein the one or more metrics include physical metrics indicating the spectator's reactions to the game.

12. The method as recited in claim 8, further comprising:
   analyzing, by the participant metrics module, game information obtained from the game to generate a feedback signal; and
   providing the feedback signal to the participant metrics device, wherein the participant metrics device provides one or more of visual, audio, or haptic indications to the spectator according to the feedback signal.

13. The method as recited in claim 8, further comprising performing said receiving, said analyzing, said generating, and said providing for metrics collected from participant metrics devices associated with a plurality of participants, wherein the plurality of participants include game players and game spectators.

14. The method as recited in claim 13, further comprising:
   analyzing, by the participant metrics module, the metrics collected from the participant metrics devices associated with the plurality of participants to determine one or more supporters of a player or team that are not currently participating as spectators watching the game; and
   providing, by the participant metrics module, a signal to one or more of the participant metrics devices associated with the determined supporters to alert the respective supporters of an event in the game, wherein the one or more participant metrics devices associated with the determined supporters provide an indication of the alert to respective participants in response to the signal, wherein the indication includes one or more of a visual, audio, or haptic indication.

15. The method as recited in claim 13, wherein the one or more devices include a game system that executes the game, wherein the information provided to the game system includes one or more game inputs determined from metrics collected from the participant metrics devices of one or more of the game spectators, and wherein the one or more game inputs affect one or more of the game players.

16. The method as recited in claim 13, wherein the one or more devices include a game system that executes the game, wherein the information provided to the game system includes one or more game inputs determined from metrics collected from the participant metrics devices of one or more of the game players, and wherein the one or more game inputs affect at least one game player.

17. The method as recited in claim 13, wherein the one or more devices include a game system that executes the game, wherein the information provided to the game system includes one or more game inputs, the method further comprising:
   determining spectators that are fans of particular players or teams of players of the game;
   analyzing, by the participant metrics module, the metrics of the fans of particular players or teams of players of the game as indicated by respective metrics input for the fans; and
   generating, by the participant metrics module, game inputs for the game that affect the particular players or teams of players based on the analysis of the metrics of the fans of the particular players or teams of players;
   wherein a player or team game input positively affects the particular player or team of players or negatively affects at least one other player or team of players.

18. The method as recited in claim 13, further comprising:
   receiving, by the participant metrics module, input indicating an alert for one or more of the participants; and
   providing, by the participant metrics module, a signal to one or more of the participant metrics devices in response to the alert, wherein the one or more participant metrics devices provide an indication of the alert to respective participants according to the signal, wherein the indication includes one or more of a visual, audio, or haptic indication.

19. The method as recited in claim 13, wherein the metrics input indicates an emotional state of one or more of the participants, the method further comprising providing an indication of the emotional state of the one or more participants to at least some of the plurality of participants via respective participant metrics devices.

20. The method as recited in claim 13, wherein the one or more devices include a game system that executes the game, wherein the information provided to the game system includes one or more game inputs, wherein the metrics input indicates a physical gesture or expression of one or more of the participants, the method further comprising providing an indication of the physical gesture or expression to the game system as a game input.

21. The method as recited in claim 8, wherein the participant metrics module is implemented as or by a service on a network, and wherein the participant metrics module provides an application programming interface (API) to receive input from and provide output to one or more game systems.

22. A non-transitory computer-readable storage medium storing program instructions that when executed on one or more computers cause the one or more computers to implement a participant metrics module configured to:
   receive metrics input from a plurality of participant metrics devices associated with a plurality of participants of a game executing on a game system, wherein the metrics input indicates one or more metrics of the plurality of participants as captured by the participant metrics devices, and wherein the participants include game players and game spectators;
   analyze the one or more metrics of the participants as indicated by the metrics input to determine a state for one or more of the participants;
   generate one or more game inputs for the game according to the determined state of the one or more participants; and
   provide the one or more game inputs to the game system, wherein the one or more game inputs affect execution of the game by the game system, and wherein the one or more game inputs are applied by the game system to affect one or more of an in-game character, a team of in-game characters, an in-game object, or an in-game environmental condition.

23. The non-transitory computer-accessible storage medium as recited in claim 22, wherein the participant metrics device include wearable devices or handheld devices, and wherein the one or more metrics include physical metrics measured by sensors of the participant metrics devices.

24. The non-transitory computer-accessible storage medium as recited in claim 22, wherein the participant metrics module is further configured to generate and store information for the game according to the determined state of the one or more participants.

25. The non-transitory computer-accessible storage medium as recited in claim 22, wherein the participant metrics module is further configured to provide at least part of the generated information to a broadcaster device associated with a game broadcaster for display.

26. The non-transitory computer-accessible storage medium as recited in claim 22, wherein the participant metrics module is further configured to:
   receive input indicating an alert for one or more of the participants; and
   provide a signal to one or more of the participant metrics devices in response to the alert, wherein the signal causes the one or more participant metrics devices to provide an indication of the alert to respective participants according to the signal, wherein the indication includes one or more of a visual, audio, or haptic indication.

* * * * *